United States Patent
Wang et al.

(10) Patent No.: US 12,276,851 B2
(45) Date of Patent: Apr. 15, 2025

(54) PHOTONIC CHIP, LIDAR, AND MOBILE DEVICE

(71) Applicant: SUTENG INNOVATION TECHNOLOGY CO., LTD., Guangdong (CN)

(72) Inventors: Hao Wang, Shenzhen (CN); Jiawen Liao, Shenzhen (CN); Penghui Dong, Shenzhen (CN); Jing Wang, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/815,113

(22) Filed: Aug. 26, 2024

(65) Prior Publication Data

US 2025/0076600 A1   Mar. 6, 2025

(51) Int. Cl.
| | |
|---|---|
| G01S 7/481 | (2006.01) |
| G01S 7/497 | (2006.01) |
| G02B 6/28 | (2006.01) |
| G02B 6/42 | (2006.01) |
| G01S 17/93 | (2020.01) |

(52) U.S. Cl.
CPC .......... *G02B 6/4286* (2013.01); *G01S 7/4811* (2013.01); *G01S 7/4818* (2013.01); *G01S 7/497* (2013.01); *G02B 6/28* (2013.01); *G02B 6/4215* (2013.01); *G01S 17/93* (2013.01)

(58) Field of Classification Search
CPC ................................ G02B 6/28; G01S 7/4818
See application file for complete search history.

(56) References Cited

U.S. PATENT DOCUMENTS

| | | | | |
|---|---|---|---|---|
| 2010/0008588 A1* | 1/2010 | Feldkhun | ............. | G01B 11/005 |
| | | | | 382/206 |
| 2021/0181310 A1* | 6/2021 | Lu | .......... | G01S 7/4818 |
| 2023/0400630 A1* | 12/2023 | Jin | .......... | G02F 1/292 |

FOREIGN PATENT DOCUMENTS

| | | |
|---|---|---|
| CN | 108020889 A | 5/2018 |
| CN | 116087914 A | 5/2023 |

OTHER PUBLICATIONS

First Office Action of CN application No. 202311104970.1, dated Oct. 8, 2023.
Decision to Grant a Patent for CN application No. 202311104970.1, dated Oct. 23, 2023.

* cited by examiner

*Primary Examiner* — Eric Wong
(74) *Attorney, Agent, or Firm* — Ladas & Parry LLP

(57) ABSTRACT

Embodiments of the present application disclose a photonic chip, a LiDAR, and a mobile device. The photonic chip has a substrate, a cladding layer, a first coupler, a first beam splitter, an emitting waveguide module, and a first optical adjusting monitoring module. The first beam splitter includes a first port, a second port, a third port, and a fourth port. The first beam splitter is configured to output the optical signal input through the first port through the third port and the fourth port, and to output the optical signal input through the third port through the first port and the second port. The first optical adjusting monitoring module includes a first photodetector. Monitors the optical power of the return light received by the emitting waveguide module through the first optical adjusting monitoring module integrated on the photonic chip, making the process more time-saving and labor-saving.

14 Claims, 10 Drawing Sheets

PHOTONIC CHIP, LIDAR, AND MOBILE DEVICE

CROSS-REFERENCE TO RELATED APPLICATION

The present application claims the benefit of priority to Chinese Patent Application No. 202311104970.1, filed on Aug. 30, 2023, which is hereby incorporated by reference in its entirety.

TECHNICAL FIELD

This application relates to the field of laser detection technology, particularly to an photonic chip, a LiDAR, and a mobile device.

BACKGROUND

FMCW (Frequency Modulated Continuous Wave) LiDAR is a high-performance LiDAR based on linear frequency modulation light source and coherent reception technology. It has advantages such as high receiving sensitivity and strong resistance to ambient light interference. FMCW LiDAR uses a highly integrated silicon photonic chip to achieve a multi-channel optical engine. In an FMCW LiDAR system, the silicon photonic chip also needs to be assembled with the transceiver lens and requires optical alignment means to align the emitting waveguide on the silicon photonic chip with the transceiver lens.

In related art, when the emitting waveguide and the transceiver lens on the silicon photonic chip are optically aligned, the emitting waveguide usually needs an external circulator to monitor the optical power of the return light to be received by the emitting waveguide and the transceiver lens are adjusted to the optimal position according to the optical power. However, the operation of externally connecting a circulator to the emitting waveguide is complicated and is not suitable for LiDAR systems that use silicon photonic chips and optical amplifiers for spatial optical coupling.

SUMMARY

Embodiments of the present application provide a photonic chip, a LiDAR, and a mobile device to address the issues where the operation of using an external circulator to achieve optical alignment monitoring is cumbersome, and it is not suitable for LiDAR systems that use silicon photonic chips and optical amplifiers for spatial optical coupling.

In a first aspect, an embodiment of the present application provides a photonic chip. The photonic chip has a first coupler, a substrate, a cladding layer, a first beam splitter, an emitting waveguide module, and a first optical adjusting monitoring module. The first coupler is used to receive a first optical signal outside the photonic chip to allow the first optical signal to enter the photonic chip. The cladding layer is provided on the substrate. The first beam splitter is embedded in the cladding layer and includes a first port, a second port, a third port, and a fourth port. The first beam splitter is configured to output the optical signal input through the first port through the third port and the fourth port, and to output the optical signal input through the third port through the first port and the second port. The first port is connected to the first coupler and is used to receive the first optical signal output by the first coupler. The emitting waveguide module is embedded in the cladding layer and is connected to the third port. The emitting waveguide module is used to transmit at least a part of the first split light signal and emit the first split light signal. The first split light signal is the signal output through the third port of the first beam splitter by the first optical signal output through the first port of the first beam splitter. The first optical adjusting monitoring module is provided on the cladding layer and is connected to the second port. The first optical adjusting monitoring module includes a first photodetector.

In a second aspect, an embodiment of the present application provides a LiDAR. The LiDAR includes a light source module and the above-mentioned photonic chip. The light source module is arranged corresponding to the first coupler and is used to generate the first optical signal. The photonic chip is used to receive the first optical signal through the first coupler.

In a third aspect, an embodiment of the present application provides a mobile device, including a movable body and the above-mentioned LiDAR.

The photonic chip, LiDAR, and mobile device of the present application achieve connection with the emitting waveguide module, the first coupler, and the first optical adjusting monitoring module through multiple ports of the first beam splitter. This allows at least a part of the first optical signal received by the first coupler to be emitted through the emitting waveguide module during optical adjusting and to be received by the emitting waveguide module after being reflected by the optical reflector. The return light received by the emitting waveguide module can reach the first optical adjusting monitoring module through the first beam splitter. The first photodetector in the first optical adjusting monitoring module can provide real-time feedback on the optical power of the return light to obtain the maximum optical power of the return light and determine the optimal position of the transceiver lens and the photonic chip based on the maximum optical power of the return light. The first photodetector can feedback the optical power of the return light through the photocurrent. If the photocurrent of the first photodetector reaches the maximum value, the optical power of the return light reaches the maximum value, and the transceiver lens and the photonic chip are adjusted to the optimal position and can be fixed.

The embodiments of the present application monitor the optical power of the return light received by the emitting waveguide module through the first optical adjusting monitoring module integrated on the photonic chip. This omits the wiring operation between the photonic chip and external auxiliary devices, saving time and effort, and can achieve self-emitting and self-receiving optical adjusting monitoring under various system architectures. It can achieve a system architecture where the optical signal is input to the photonic chip through an optical amplifier or through a single-mode optical fiber.

BRIEF DESCRIPTION OF DRAWINGS

In order to more clearly illustrate the technical solutions of the embodiments of the present application, the drawings required for the description of the embodiments will be briefly introduced below.

DESCRIPTION OF REFERENCE NUMERALS IN THE DRAWINGS

1. Photonic chip;
2. LiDAR;
100. Mobile device;
110. Main body;
10. Edge coupler;
11. First substrate;
111. Groove;
12. First cladding layer;
121. Main portion;
122. First connecting portion;
123. Second connecting portion;
1231. First sub-part;
1232. Second sub-part;
1233. First side wall;
1234. Second side wall;
1235. Third side wall;
1236. Fourth side wall;
124. Third connecting portion;
125. Through hole;
13. Transmitting waveguide assembly;
131. Transmitting waveguide;
131a. First transmitting waveguide;
131b. Second transmitting waveguide;
1311. First end;
1312. Second end;
1313. First coupling portion;
1314. Second coupling portion;
1315. First transmission portion;
1316. Second transmission portion;
1317. First part;
1318. Second part;
1319. Output portion;
132. Combiner;
1321. Input end;
1322. Output end;
133. First grating part;
1331. First grating unit;
134. Second grating part;
1341. Second grating unit;
1342. Connecting part;
14. Light receiving end;
15. Light emitting end;
30. Cladding layer;
41. Emitting waveguide module;
411. Emitting waveguide;
42. Receiving waveguide module;
421. Receiving waveguide;
4211. First receiving waveguide;
43. Auxiliary waveguide;
51. First coupler;
52. Second coupler;
61. First beam splitter;
611. First port;
612. Second port;
613. Third port;
614. Fourth port;
62. Second beam splitter;
621. Fifth port;
622. Sixth port;
623. Seventh port;
624. Eighth port;
71. First optical adjusting monitoring module;
711. First photodetector;
712. First interlayer converter;
72. Second optical adjusting monitoring module;
721. Second photodetector;
722. Third interlayer converter;
81. Photoelectric detection module;
82. Second interlayer converter;
83. Fourth interlayer converter;
3. Light source module;
31. Laser;
32. Optical amplifier;
4. Third optical adjusting monitoring module;
5. Circulator;
511. Ninth port;
512. Tenth port;
513. Eleventh port;
6. Auxiliary light source;
7. Optical power meter;
8. Transceiver lens;
9. Optical retarder;
x. First direction;
y. Second direction;
z. Thickness direction.

DETAILED DESCRIPTION

To make the objectives, technical solutions, and advantages of this application clearer, the following will provide a detailed description of the embodiments of this application in conjunction with the accompanying drawings. When the following description involves the accompanying drawings, unless otherwise indicated, the same numbers in different drawings represent the same or similar elements.

In a first aspect, embodiments of this application provide an edge coupler for use in an photonic chip, to couple an optical signal from outside the photonic chip into the photonic chip.

Figure 1:
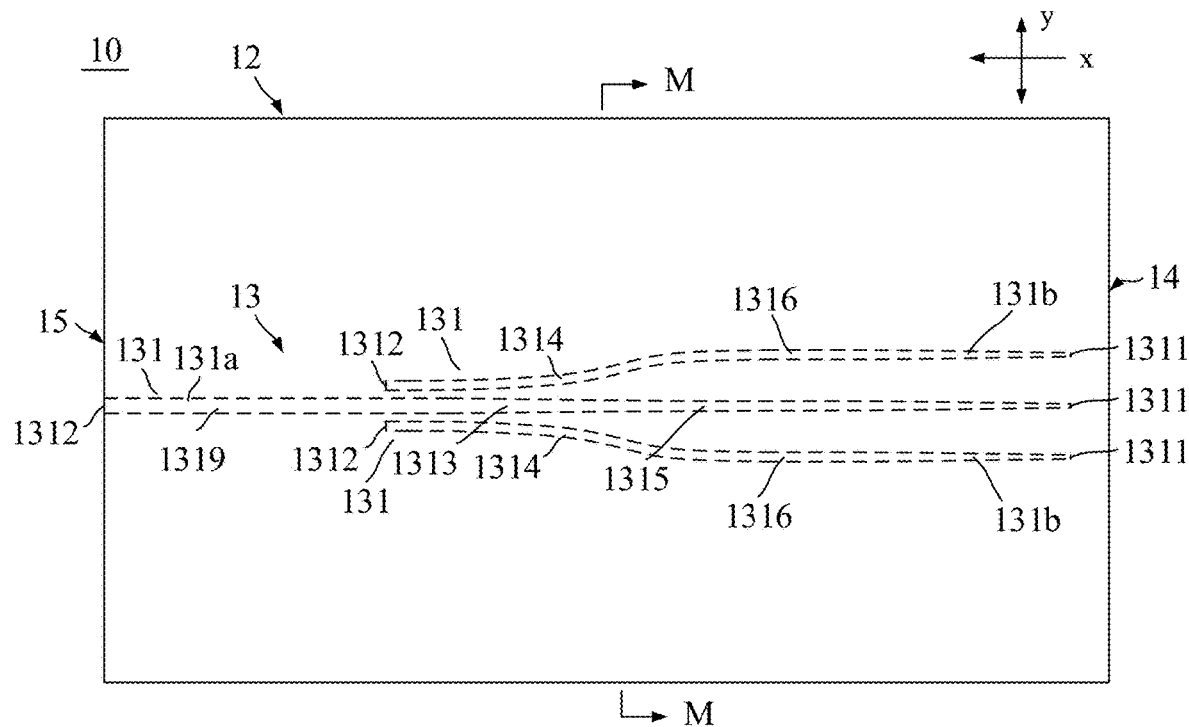
FIG. 1 is a partial perspective structural schematic diagram of an edge coupler provided by an embodiment.
Figure 2:
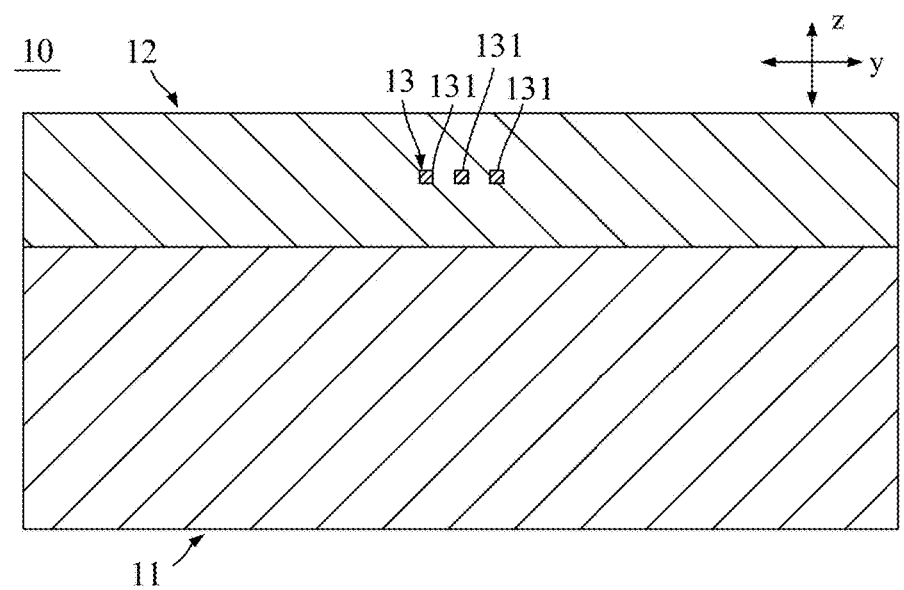
FIG. 2 is a structural schematic diagram in the M-M direction of FIG. 1.

Refer to FIGS. 1 and 2, which respectively show a structural schematic and a structural schematic in the M-M direction of the edge coupler 10 of an embodiment. The edge coupler 10 includes a first substrate 11, a first cladding layer 12 provided on the first substrate 11, and a transmitting waveguide assembly 13 embedded in the first cladding layer 12.

The first substrate 11 is a base material for laying the first cladding layer 12; in an embodiment, the first substrate 1 is made of silicon. The first substrate 11 can be made of other suitable materials, such as silicon nitride. The first cladding layer 12 is deposited or grown on the first substrate 11, forming one of the main structures of the edge coupler 10 and the structure to which the transmitting waveguide assembly 13 is attached. The material of the first cladding layer 12 is different from that of the first substrate 11 and can be made of materials such as silicon dioxide and/or silicon oxynitride. The transmitting waveguide assembly 13 is used to transmit the optical signal entering the edge coupler 10 and couple the optical signal into the photonic chip 1, enhancing the coupling efficiency of the optical signal entering the photonic chip 1. The transmitting waveguide assembly 13 is embedded in the first cladding layer 12, and the refractive index of the transmitting waveguide assembly 13 is greater than that of the first cladding layer 12. Therefore, the transmitting waveguide assembly 13 and the first cladding layer 12 together form a structure for stable optical transmission, meaning that light can be transmitted along the transmitting waveguide assembly 13 without leaking out. In an embodiment, the first cladding layer 12 is made of silicon dioxide, the transmitting waveguide assembly 13 is made of silicon nitride, which has a greater refractive index, or other materials with a refractive index greater than that of the first cladding layer 12, such as silicon. In an embodiment, the various transmitting waveguides 131 included in the transmitting waveguide assembly 13 is made of different materials.

Refer to FIGS. 1 and 2, the transmitting waveguide assembly 13 includes at least two transmitting waveguides 131. The transmitting waveguide 131 has a first end 1311 and a second end 1312 arranged along the first direction x, with the first end 1311 being closer to the light receiving end 14 of the edge coupler 10, and the second end 1312 being closer to the light emitting end 15 of the edge coupler 10. The light receiving end 14 is the end of the edge coupler 10 that receives the optical signal, and the light emitting end 15 is the end of the edge coupler 10 that outputs the optical signal. The light receiving end 14 and the light emitting end 15 can generally be opposite ends of the edge coupler 10. The optical signal is coupled into the edge coupler 10 through the light receiving end 14, transmitted within the edge coupler 10, and output through the light emitting end 15 to downstream optical devices. The first direction x is determined by the direction from the light receiving end 14 to the light emitting end 15 of the edge coupler 10 and is perpendicular to the thickness direction z of the edge coupler 10. The transmitting waveguide 131 can extend substantially along the first direction x so that the optical signal is transmitted overall in the first direction x downstream; in an embodiment, the transmitting waveguide 131 can extend substantially straight or curved along the first direction x.

At least two transmitting waveguides 131 include a first transmitting waveguide 131a and at least one second transmitting waveguide 131b. Along the thickness direction z of the edge coupler 10, the first transmitting waveguide 131a and the second transmitting waveguide 131b are arranged relative to each other along the second direction y. Along the thickness direction z, a component relative to another component along the second direction y mean that the extending direction of one component and the extending direction of another component are substantially the same and are arranged at intervals along the second direction y relative to each other. The second direction y is perpendicular to both the aforementioned thickness direction z and the first direction x, meaning the first direction x, the second direction y, and the thickness direction z of the edge coupler 10 are all mutually perpendicular.

The transmitting waveguide assembly 13 is configured to enable the optical signal transmitted by the second transmitting waveguide 131b to be combined into the first transmitting waveguide 131a in a directional coupling manner. The transmitting waveguide assembly 13 is used to receive an optical signal through the first end 1311 of at least two transmitting waveguides 131 and output an optical signal through the second end 1312 of the first transmitting waveguide 131a. The transmitting waveguide assembly 13 of this embodiment can achieve multi-waveguide input and single-waveguide output, which can increase the light receiving area of the transmitting waveguide assembly 13, improve the receiving mode field of the transmitting waveguide assembly 13, thereby enhancing the coupling efficiency of external optical signals and reducing coupling losses.

Where the first end 1311 of the transmitting waveguide 131 can be located inside the first cladding layer 12, the path of optical signal transmission in the edge coupler 10 can be: the optical signal outside the edge coupler 10 is received by the first cladding layer 12 at the light receiving end 14 and enters the first cladding layer 12 for transmission; then the optical signal is received by the first end 1311 of at least two transmitting waveguides 131 and enters the transmitting waveguide assembly 13 for transmission; the optical signal is output by the second end 1312 of the first transmitting waveguide 131a out of the edge coupler 10. The first end 1311 of the transmitting waveguide 131 can extend to the light receiving end 14 of the edge coupler 10, allowing the optical signal to directly enter the edge coupler 10 through the first end 1311 of the transmitting waveguide 131, instead of entering the edge coupler 10 through the first cladding layer 12 and then being transmitted to the first end 1311 of the transmitting waveguide 131.

Where a first end 1311 of the first transmitting waveguide 131a can be aligned with a first end of the second transmitting waveguide 131b, to jointly receive the optical signal, or it can be located between the first end 1311 and a second end 1312 of the second transmitting waveguide 131b, to couple the optical signal received by the second transmitting waveguide 131b. The second end 1312 of the first transmitting waveguide 131a can be set to exceed the second end 1312 of the second transmitting waveguide 131b, so that the optical signal within the transmitting waveguide assembly 13 can be output by the second end 1312 of the first transmitting waveguide 131a. The first transmitting waveguide 131a can include an output portion 1319 that extends beyond the second transmitting waveguide 131b and has the second end 1312. Where along the first direction x, the cross-sectional profile of the output portion 1319 can remain unchanged. In an embodiment, the second end 1312 of the first transmitting waveguide 131a can extend to the light emitting end 15, so that the light emitting end 15 can output the optical signal through the second end 1312 of the first transmitting waveguide 131*a*.

Referring to FIG. 1, the first transmitting waveguide 131*a* includes a first coupling portion 1313, and the second transmitting waveguide 131*b* includes a second coupling portion 1314. the first coupling portion 1313 and the second coupling portion 1314 are arranged relative to each other along the second direction y. The first coupling portion 1313 and the second coupling portion 1314 are configured to enable the optical signal in the second coupling portion 1314 to be combined into the first coupling portion 1313 in a directional coupling manner. The first coupling portion 1313 and the second coupling portion 1314 together form a module that can achieve optical coupling. In an embodiment, the first coupling portion 1313 and the second coupling portion 1314 meet at least one of the following conditions: the distance between the centerline of the first coupling portion 1313 and the centerline of the second coupling portion 1314 gradually decreases along the first direction x; along the first direction x, the cross-sectional profile of the first coupling portion 1313 gradually increases; along the first direction x, the cross-sectional profile of the second coupling portion 1314 gradually decreases.

Where the distance between the centerline of the first coupling portion 1313 and the centerline of the second coupling portion 1314 gradually decreases along the first direction x, so that the optical signal in the second coupling portion 1314 is coupled into the first coupling portion 1313 in a directional coupling manner when the optical signal in the second coupling portion 1314 is transmitted along the first direction x to a position closer to the first coupling portion 1313. The closer the distance between the centerline of the first coupling portion 1313 and the centerline of the second coupling portion 1314, the higher the optical coupling efficiency between the second coupling portion 1314 and the first coupling portion 1313. In an embodiment, the minimum distance between the centerline of the second coupling portion 1314 and the centerline of the first coupling portion 1313 can be adjusted. In an embodiment, the longer the length of the part along the first direction x where the distance between the centerline of the first coupling portion 1313 and the centerline of the second coupling portion 1314 is close, the higher the optical coupling efficiency between the second coupling portion 1314 and the first coupling portion 1313.

Where the distance between the centerline of the first coupling portion 1313 and the centerline of the second coupling portion 1314 gradually decreases along the first direction x can be a gradual decrease with a fixed slope or a gradual decrease with a varying slope. In an embodiment, the distance between the centerline of the first coupling portion 1313 and the centerline of the second coupling portion 1314 gradually decreases along the first direction x from small to large and then to small again. The distance between the centerline of the first coupling portion 1313 and the centerline of the second coupling portion 1314 first decreases with a small amplitude, then decreases with a large amplitude, and then decreases with a small amplitude. This ensures that the second coupling portion 1314 is smoothly connected to its upstream part, making the overall shape change of the second coupling portion 1314 smooth, thereby allowing the optical signal to be transmitted in the second transmitting waveguide 131*b* with low loss and ensuring that the optical signal can be coupled into the first transmitting waveguide 131*a* with high coupling efficiency. In an embodiment, the centerline of the first coupling portion 1313 can extend in a straight line direction, and the distance change between the centerline of the first coupling portion 1313 and the centerline of the second coupling portion 1314 can be achieved by the curvature change of the second coupling portion 1314, while the first coupling portion 1313 does not undergo curvature change, reducing the manufacturing cost of the transmitting waveguide assembly 13. The centerline of the entire first transmitting waveguide 131*a* can extend in a straight line direction. In an embodiment, the centerline of a component meets the following condition: the extension direction of the centerline is consistent with the extension direction of the component, and the width of the component on both sides of the centerline is the same, where the width can be the size along the second direction y.

Where the cross-sectional profile of the second coupling portion 1314 gradually decreases along the first direction x, during the transmission of the optical signal along the first direction x in the second coupling portion 1314, the optical signal transmitted in the second coupling portion 1314 can overflow, which is beneficial for the optical signal to be combined into the first transmitting waveguide 131*a* in a directional coupling manner. Where the cross-sectional profile of the first coupling portion 1313 gradually increases along the first direction x, the effective refractive index of the first coupling portion 1313 is increased, which is beneficial for the optical signal overflowing from the second coupling portion 1314 to be combined into the first coupling portion 1313 in a directional coupling manner and transmitted in the first coupling portion 1313.

In an embodiment, the cross-sectional profile of a component gradually increasing (decreasing) along the first direction x mean that the cross-sectional profile of the component perpendicular to the first direction x gradually increases (decreases) with a fixed slope, or it mean that the cross-sectional profile of the component perpendicular to the first direction x gradually increases (decreases) with a varying slope. Where the cross-sectional profile of a component gradually increasing (decreasing) along the first direction x mean that the width of the component gradually increases (decreases) along the first direction x. In an embodiment the width of the component can gradually increase (decrease) with a fixed slope or gradually increase (decrease) with a varying slope. Where the varying slope can be like the varying rate from small to large and then to small as described above.

Figure 3:
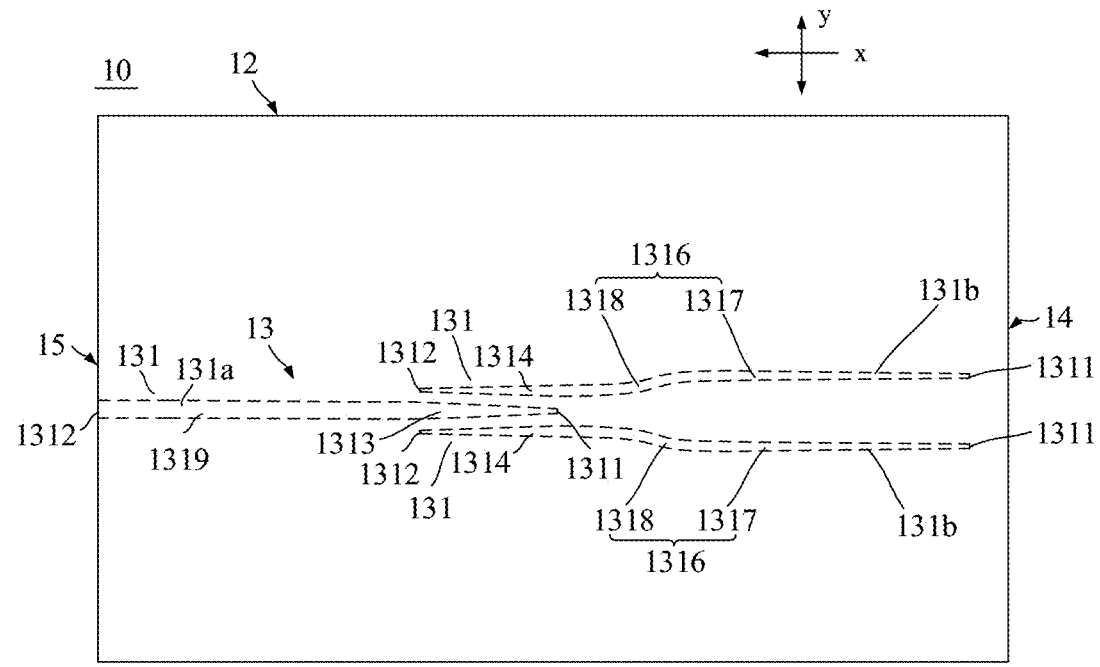
FIG. 3 is a structural schematic diagram of an edge coupler provided by an embodiment.

In an embodiment, the transmitting waveguide assembly 13 is configured to receive an optical signal through the first ends 1311 of at least two transmitting waveguides 131, which mean receiving the optical signal through the first ends 1311 of the first transmitting waveguide 131*a* and the second transmitting waveguide 131*b* together, as shown in FIG. 1, or the transmitting waveguide assembly 13 includes at least two second transmitting waveguides 131*b*, and the transmitting waveguide assembly 13 receives the optical signal through the first ends 1311 of the second transmitting waveguides 131*b* together, as shown in FIG. 3.

The first end 1311 of the first transmitting waveguide 131*a* and the first end 1311 of the second transmitting waveguide 131*b* are arranged relative to each other along the second direction y, so that when the optical signal is at the position corresponding to the first end 1311 of the first transmitting waveguide 131*a* within the transmitting waveguide assembly 13, it is transmitted in both the first transmitting waveguide 131*a* and the second transmitting waveguide 131*b*. The distance between the end face of the first end 1311 of the first transmitting waveguide 131*a* and the end face of the first end 1311 of the second transmitting waveguide 131*b* along the first direction x is less than or equal to the first predetermined value, making the first end 1311 of the first transmitting waveguide 131a and the first end 1311 of the second transmitting waveguide 131b substantially aligned along the second direction y, and the end faces of the first end 1311 of the first transmitting waveguide 131a and the first end 1311 of the second transmitting waveguide 131b can receive the optical signal transmitted in the first cladding layer 12 simultaneously. The first predetermined value can be flexibly set.

In an embodiment, if the transmitting waveguide assembly 13 receives the optical signal through the first ends 1311 of the first transmitting waveguide 131a and the second transmitting waveguide 131b together, the transmitting waveguide assembly 13 can include one second transmitting waveguide 131b, or at least two second transmitting waveguides 131b, for example, two, three, four, five second transmitting waveguides 131b, as long as each second transmitting waveguide 131b combine the optical signal it transmits into the first transmitting waveguide 131a in a directional coupling manner. In an embodiment, the transmitting waveguide assembly 13 includes one first transmitting waveguide 131a and two second transmitting waveguides 131b, and viewed along the aforementioned thickness direction z, the two second transmitting waveguides 131b are respectively located on opposite sides of the first transmitting waveguide 131a along the second direction y, making the transmitting waveguide assembly 13 have the advantages of a simple structure, convenient manufacturing, sufficient light receiving area, and low optical loss.

The two second transmitting waveguides 131b can be symmetrically distributed about the centerline of the first transmitting waveguide 131a, making the light receiving amount of the two second transmitting waveguides 131b, the optical coupling efficiency between the two second transmitting waveguides 131b and the first transmitting waveguide 131a, etc., approximately the same, reducing the design difficulty of the two second transmitting waveguides 131b and manufacturing costs. The two second transmitting waveguides 131b can be asymmetrically distributed about the centerline of the first transmitting waveguide 131a, making the combined design form of the two second transmitting waveguides 131b more diverse.

The first transmitting waveguide 131a can include a first transmission portion 1315, which is located upstream of the optical path of the first coupling portion 1313, and the end of the first transmission portion 1315 away from the first coupling portion 1313 is the first end 1311 of the first transmitting waveguide 131a; the second transmitting waveguide 131b can include a second transmission portion 1316, viewed along the thickness direction z, the second transmission portion 1316 and the first transmission portion 1315 are arranged relative to each other along the second direction y, and the second transmission portion 1316 is located upstream of the optical path of the second coupling portion 1314. The end of the second transmission portion 1316 away from the second coupling portion 1314 is the first end 1311 of the second transmitting waveguide 131b. The transmitting waveguide assembly 13 is configured to receive the optical signal through the first transmission portion 1315 of the first transmitting waveguide 131a and the second transmission portion 1316 of the second transmitting waveguide 131b together.

The first transmission portion 1315 and the second transmission portion 1316 meet at least one of the following conditions: the distance between the centerline of the first transmission portion 1315 and the centerline of the second transmission portion 1316 along the first direction x remains unchanged or gradually decreases; along the first direction x, the cross-sectional profile of the first transmission portion 1315 gradually increases; along the first direction x, the cross-sectional profile of the second transmission portion 1316 gradually increases. Where the distance between the centerline of the first transmission portion 1315 and the centerline of the second transmission portion 1316 gradually decreases along the first direction x, it can ensure that the transmitting waveguide assembly 13 has a large receiving mode field, and in the case of a large receiving mode field, the distance between the two gradually decreases along the first direction x, which can meet the requirement that the optical signal overflowing from the second coupling portion 1314 is combined into the first coupling portion 1313 in a directional coupling manner and transmitted in the first coupling portion 1313. Where the cross-sectional profile of the first transmission portion 1315 gradually increases along the first direction x, the end face size of the first end 1311 of the first transmitting waveguide 131a for receiving the optical signal is small. A small end face size is conducive to ensuring a larger mode field diameter, improving the optical receiving tolerance of the first transmitting waveguide 131a, while the gradually increasing cross-sectional profile can transition to a size where light is stably transmitted. Where the cross-sectional profile of the second transmission portion 1316 gradually increases along the first direction x, the end face size of the first end 1311 of the second transmitting waveguide 131b for receiving the optical signal is small. A small end face size is conducive to ensuring a larger mode field diameter, improving the optical receiving tolerance of the second transmitting waveguide 131b, while the gradually increasing cross-sectional profile can transition to a size where light can be stably transmitted.

In an embodiment, the cross-sectional profile change pattern of the first transmission portion 1315 along the first direction x and the cross-sectional profile change pattern of the second transmission portion 1316 along the first direction x can be same. In an embodiment, along the first direction x, the cross-sectional profiles of the first transmission portion 1315 and the second transmission portion 1316 both gradually increase with a fixed slope, and the fixed slopes corresponding to the two are equal.

If the transmitting waveguide assembly 13 receives the optical signal through the first ends 1311 of the first transmitting waveguide 131a and the second transmitting waveguide 131b together, the first transmitting waveguide 131a can include a first transmission portion 1315, a first coupling portion 1313 located downstream of the first transmission portion 1315, and an output portion 1319 located downstream of the first coupling portion 1313. The second transmitting waveguide 131b can include a second transmission portion 1316 and a second coupling portion 1314 located downstream of the second transmission portion 1316. Where, viewed along the thickness direction z, the first transmission portion 1315 and the second transmission portion 1316 are arranged relative to each other along the second direction y, the first coupling portion 1313 and the second coupling portion 1314 are arranged relative to each other along the second direction y, and the output portion 1319 extends beyond the second transmitting waveguide 131b. The transmitting waveguide assembly 13 receives the optical signal through the first transmission portion 1315 and the second transmission portion 1316 so that the optical signal is transmitted along the first transmission portion 1315 and the second transmission portion 1316 and is coupled into the first coupling portion 1313 at the first coupling portion 1313 and the second coupling portion

1314, so that the optical signal is transmitted in the first transmitting waveguide 131a and output to downstream optical devices through the second end 1312 of the first transmitting waveguide 131a.

In an embodiment, the aforementioned first transmission portion 1315 and second transmission portion 1316 can also be omitted. The transmitting waveguide assembly 13 can receive the optical signal through the aforementioned first coupling portion 1313 and second coupling portion 1314, and the first transmitting waveguide 131a and the second transmitting waveguide 131b can start coupling after receiving the optical signal. As long as the first transmitting waveguide 131a and the second transmitting waveguide 131b jointly receive the optical signal and the optical signal transmitted by the second transmitting waveguide 131b can be coupled into the first transmitting waveguide 131a.

Refer to FIG. 3, the way the transmitting waveguide assembly 13 receives the optical signal through the first ends 1311 of the second transmitting waveguides 131b together is disclosed.

The first transmitting waveguide 131a include a first coupling portion 1313 located between the two second transmitting waveguides 131b and an output portion 1319 located downstream of the first coupling portion 1313 and extending beyond the second transmitting waveguide 131b. The end of the first coupling portion 1313 away from the output portion 1319 can be the first end 1311 of the first transmitting waveguide 131a, and the end of the output portion 1319 away from the first coupling portion 1313 can be the second end 1312 of the first transmitting waveguide 131a. The structures of the first coupling portion 1313 and the output portion 1319 can be as described above.

The second transmitting waveguide 131b includes a second coupling portion 1314 and a second transmission portion 1316, viewed along the thickness direction z, the second coupling portion 1314 and the first coupling portion 1313 are arranged relative to each other along the second direction y, and the second transmission portion 1316 is connected upstream of the optical path of the second coupling portion 1314. The end of the second transmission portion 1316 away from the second coupling portion 1314 can be the first end 1311 of the second transmitting waveguide 131b, and the end of the second coupling portion 1314 away from the second transmission portion 1316 can be the second end 1312 of the second transmitting waveguide 131b.

The structure of the second transmission portion 1316 can be: along the first direction x, the cross-sectional profile of the second transmission portion 1316 gradually increases. The second transmission portion 1316 can include a first part 1317 and a second part 1318, as shown in FIG. 3, the two ends of the second part 1318 are respectively connected to the first part 1317 and the second coupling portion 1314, and the end of the first part 1317 away from the second part 1318 is the first end 1311 of the second transmitting waveguide 131b. The first part 1317 and the second part 1318 can meet at least one of the following conditions: the distance between the centerlines of the two first parts 1317 along the first direction x remains unchanged; the distance between the centerlines of the two second parts 1318 along the first direction x gradually decreases; along the first direction x, the cross-sectional profile of the first part 1317 gradually increases. Where the distance between the centerlines of the two first parts 1317 along the first direction x remains unchanged and the distance between the centerlines of the two second parts 1318 along the first direction x gradually decreases, making the distance between the centerlines of the two first parts 1317 greater than the distance between the two second coupling portions 1314, is conducive to ensuring that the transmitting waveguide assembly 13 can receive the optical signal with a large mode field. The distance between the centerlines of the two second parts 1318 along the first direction x gradually decreases, which can reduce the distance between the two second transmitting waveguides 131b and the first transmitting waveguide 131a, is conducive to achieving a small distance between the second coupling portion 1314 located downstream of the second part 1318 and the first coupling portion 1313, to improve the optical coupling efficiency between the second transmitting waveguide 131b and the first transmitting waveguide 131a. The distance between the centerlines of the two second parts 1318 along the first direction x can gradually decrease with a fixed slope or with a varying slope (e.g., from small to large and then to small).

Where the cross-sectional profile of the first part 1317 gradually increases along the first direction x, the end face size of the first end 1311 of the second transmitting waveguide 131b for receiving the optical signal is small. A small end face size is conducive to ensuring a larger mode field diameter, improving the optical receiving tolerance of the second transmitting waveguide 131b, while the gradually increasing cross-sectional profile can transition to a size where light can be stably transmitted. Where the cross-sectional profile of the second part 1318 can gradually increase, decrease, or remain unchanged along the first direction x.

The transmitting waveguide assembly 13 can receive the optical signal with a large mode field through either the first transmitting waveguide 131a and the second transmitting waveguide 131b together or through at least two second transmitting waveguides 131b, and the first transmitting waveguide 131a output the optical signal that has been coupled from the second transmitting waveguide 131b.

The shape of each transmitting waveguide 131 in the transmitting waveguide assembly 13 can be varied, and the structure of the transmitting waveguide 131 will be supplemented next.

In an embodiment, combined with FIGS. 1 and 3, the first end 1311 of the transmitting waveguide 131 for receiving the optical signal can be substantially in the shape of an inverted cone, as shown in FIG. 1, where the cross-sectional profile of the first transmission portion 1315 and the second transmission portion 1316 gradually increases along the first direction x; as shown in FIG. 3, the cross-sectional profile of the first part 1317 of the second transmission portion 1316 gradually increases along the first direction x.

Figure 4:
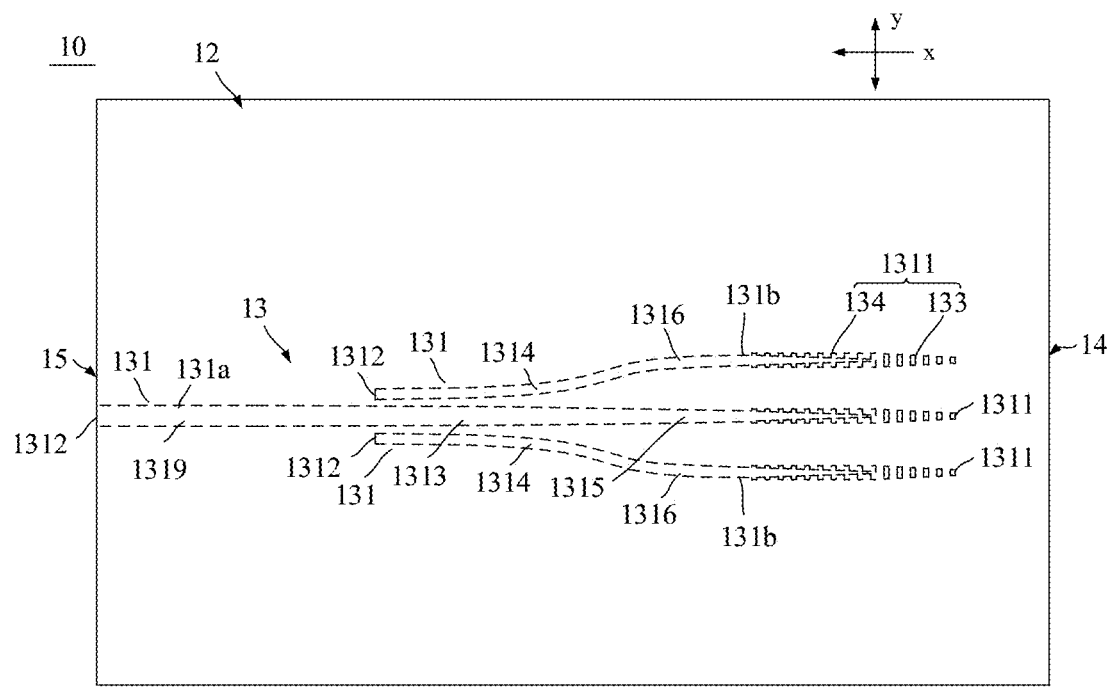
FIG. 4 is a structural schematic diagram of an edge coupler provided by an embodiment.
Figure 5:
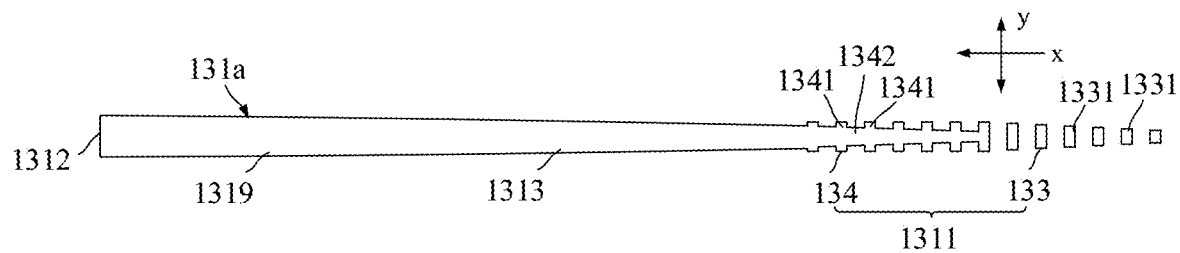
FIG. 5 is a structural schematic diagram of the first transmission waveguide in the edge coupler shown in FIG. 4.
Figure 6:
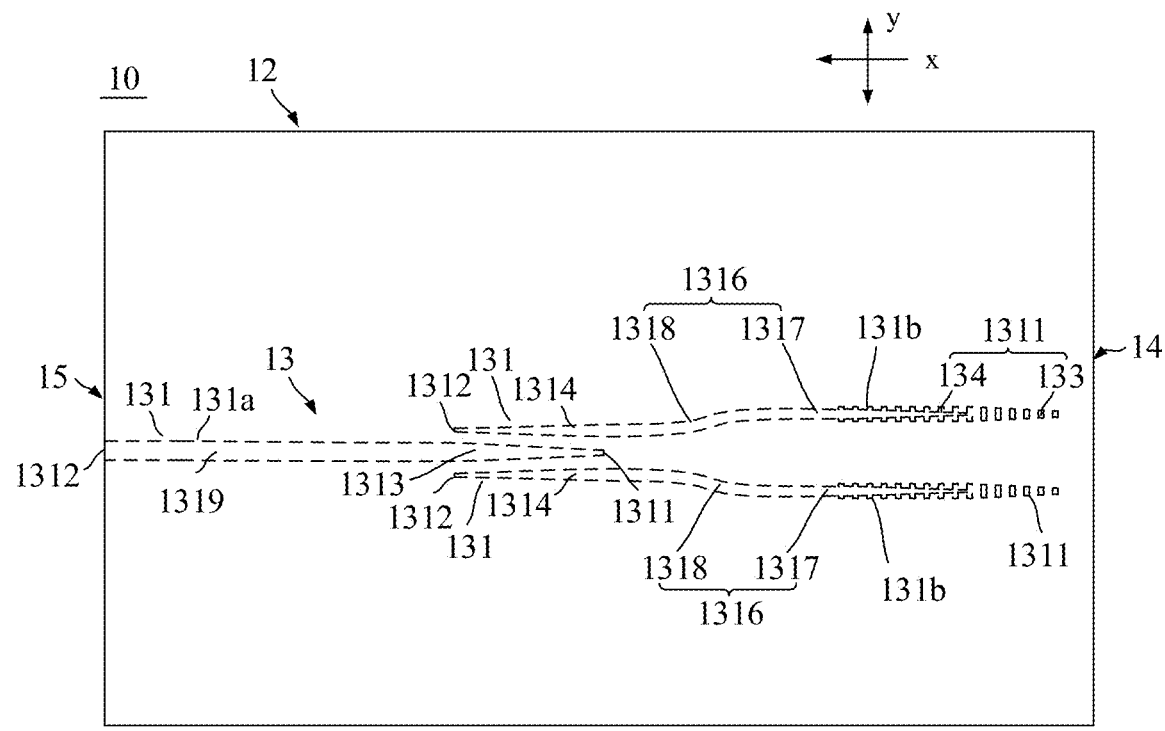
FIG. 6 is a structural schematic diagram of an edge coupler provided by an embodiment.

In an embodiment, combined with FIGS. 4 to 6, the first end 1311 of the transmitting waveguide 131 for receiving the optical signal can be in the form of a grating structure, as shown in FIG. 4, where the first end 1311 of the first transmission portion 1315 and the second transmission portion 1316 can be substantially in the form of a grating structure, as shown in FIG. 6, where the first end 1311 of the first part 1317 of the second transmission portion 1316 can be substantially in the form of a grating structure.

Where the grating structure includes a first grating part 133 and a second grating part 134, the first grating part 133 is located upstream of the second grating part 134 in the optical path. Referring to FIG. 5, the first grating part 133 includes multiple first grating units 1331 arranged at intervals along the first direction x, and along the first direction x, the cross-sectional profiles of the first grating units 1331 remain constant, and the cross-sectional profiles between the first grating units 1331 gradually increase in sequence, the cross-sectional profile of the first grating unit 1331 located downstream along the first direction is larger than that of the upstream grating unit. Where the gradual increase can be with a fixed slope or with a varying slope. In an embodiment, the cross-sectional profiles between the first grating units 1331 gradually increase with a fixed slope along the first direction x. Each first grating unit 1331 increases by the same area compared to the upstream first grating unit 1331.

Where the cross-sectional profiles between the first grating units 1331 gradually increase along the first direction x can mean that the widths of the first grating units 1331 gradually increase along the first direction x. In an embodiment, the widths of the first grating units 1331 gradually increase with a fixed slope along the first direction x. Each first grating unit 1331 increases by the same width compared to the upstream first grating unit 1331.

If each first grating unit 1331 is in the shape of a cuboid extending along the first direction x, then the cross-sectional profile of each first grating unit 1331 is rectangular. The cross-sectional profiles between the first grating units 1331 gradually increase in sequence along the first direction x mean that the area of the rectangle corresponding to the cross-sectional profile of the first grating unit 1331 located first in the first direction x is smaller than the area of the rectangle corresponding to the cross-sectional profile of the first grating unit 1331 located second in the first direction x; the area of the rectangle corresponding to the cross-sectional profile of the first grating unit 1331 located second in the first direction x is smaller than the area of the rectangle corresponding to the cross-sectional profile of the first grating unit 1331 located third in the first direction x, and so on. The cross-sectional profiles between the first grating units 1331 increase with a fixed slope along the first direction x can mean that the area of the rectangle corresponding to the cross-sectional profile of the first grating unit 1331 located second in the first direction x increases by a compared to the area of the rectangle corresponding to the cross-sectional profile of the first grating unit 1331 located first in the first direction x; the area of the rectangle corresponding to the cross-sectional profile of the first grating unit 1331 located third in the first direction x also increases by a compared to the area of the rectangle corresponding to the cross-sectional profile of the first grating unit 1331 located second in the first direction x.

Where the extension lengths of the first grating units 1331 along the first direction x can be equal, the intervals between adjacent first grating units 1331 along the first direction x can be equal, the duty cycle of the first grating part 133 in each region can be constant. The extension lengths and intervals described above can also vary, that is, the duty cycle of the first grating part 133 in each region can also vary. The centerlines of multiple first grating units 1331 can be on the same straight line, or the centerlines of at least two first grating units 1331 can be on different straight lines and adjusted.

Each first grating unit 1331 has a fifth side wall and a sixth side wall facing each other along the second direction y, and the fifth side wall and the sixth side wall of the upstream first grating unit 1331 can be located between the fifth side wall and the sixth side wall of the downstream second grating part 134. Where the fifth side wall and the sixth side wall of each first grating unit 1331 can be symmetrical about the centerline of the first grating part 133; the centerline of the first grating part 133 can be the line connecting the centerlines of multiple first grating units 1331. The fifth side wall and the sixth side wall of each first grating unit 1331 can be perpendicular to the second direction y.

The second grating part 134 includes multiple second grating units 1341 arranged at intervals along the first direction x and connecting parts 1342 connecting adjacent second grating units 1341. Along the first direction x, the cross-sectional profiles of the second grating units 1341 remain constant, and the cross-sectional profiles of any adjacent two second grating units 1341 are the same. In an embodiment, each second grating unit 1341 is in the shape of a cuboid extending along the first direction x, and the cross-sectional profile of each second grating unit 1341 is rectangular, with the same rectangular contour and area.

Where the extension lengths of the second grating units 1341 along the first direction x can be equal, the intervals between adjacent second grating units 1341 along the first direction x can be equal, the duty cycle of the second grating part 134 in each region can be constant. The extension lengths and intervals described above can also vary, the duty cycle of the second grating part 134 in each region can vary.

Each second grating unit 1341 has a seventh side wall and an eighth side wall facing each other along the second direction y. The seventh side wall of multiple second grating units 1341 can be on one side of the second grating part 134, and the seventh side wall of multiple second grating units 1341 can be on the same plane, which can be perpendicular to the second direction y. The eighth side wall of multiple second grating units 1341 can be on the other side of the second grating part 134, and the eighth side wall of multiple second grating units 1341 can be on the same plane, which can be perpendicular to the second direction y. Where the seventh side wall and the eighth side wall of each second grating unit 1341 can be symmetrical about the centerline of the second grating part 134. The centerline of the second grating part 134 can be the line connecting the centerlines of multiple second grating units 1341 and multiple connecting parts 1342.

The second grating unit 1341 located closest to the first grating part 133 among multiple second grating units 1341 can be similar to the first grating unit 1331 located closest to the second grating part 134 among multiple first grating units 1331. In an embodiment, the cross-sectional profile shape and extension length along the first direction x of the second grating unit 1341 located closest to the first grating part 133 among multiple second grating units 1341 are the same as those of the first grating unit 1331 located closest to the second grating part 134 among multiple first grating units 1331.

Along the first direction x, the cross-sectional profile of each connecting part 1342 gradually increases, and the initial width of the downstream connecting part 1342 is greater than that of the upstream connecting part 1342. In an embodiment, the initial width of the downstream connecting part 1342 is greater than the final width of the upstream connecting part 1342; viewed along the thickness direction z, the hypotenuses of multiple connecting parts 1342 can be on the same isosceles trapezoid. Since the cross-sectional profile of each connecting part 1342 gradually increases, and the cross-sectional profile of the next connecting part 1342 is larger than that of the previous connecting part 1342, the change in the mode field of the optical signal in the second grating part 134 is smoother compared to the second grating part 134 using the second grating units 1341, and after passing through the second grating part 134, the mode field is substantially compressed within the transmitting waveguide 131 for transmission. Where the cross-sectional profile of each connecting part 1342 can gradually increase with a fixed slope along the first direction x or with a varying slope. In an embodiment, the cross-sectional profile of each connecting part 1342 gradually increases with a fixed slope along the first direction x. In an embodiment, the width of each connecting part 1342 gradually increases with a fixed slope along the first direction x. Where the fixed slope of the cross-sectional profile increase of each connecting part 1342 along the first direction x can be equal.

Each connecting part 1342 has a ninth side wall and a tenth side wall facing each other along the second direction y. The ninth side wall of multiple connecting parts 1342 can be on one side of the second grating part 134, and the ninth side wall of multiple connecting parts 1342 can be on the same plane, which can be inclined relative to the first direction x. The tenth side wall of multiple connecting parts 1342 can be on the other side of the second grating part 134, and the tenth side wall of multiple connecting parts 1342 can be on the same plane, which can be inclined relative to the first direction x. Where the ninth side wall and the tenth side wall of each connecting part 1342 can be symmetrical about the centerline of the second grating part 134.

In an embodiment, the first end 1311 of the transmitting waveguide 131 in the transmitting waveguide assembly 13 designed with the aforementioned first grating part 133 and the second grating part 134 can change the effective refractive index of the first end 1311 by changing the structural dimensions of the first grating part 133, the structural dimensions of the second grating part 134, the intervals between adjacent first grating units 1331, and the intervals between adjacent second grating units 1341, making the first end 1311 capable of coupling with external optical signals with a larger initial mode field, thereby improving coupling efficiency.

The first end 1311 of the transmitting waveguide 131 in the transmitting waveguide assembly 13 designed for receiving the optical signal can include the aforementioned first grating part 133 and the second grating part 134, or the first end 1311 of all the transmitting waveguides 131 in the transmitting waveguide assembly 13 designed for receiving the optical signal can include the aforementioned first grating part 133 and the second grating part 134.

In an embodiment, refer to FIGS. 1 to 4, the first cladding layer 12 can be a structure with an unchanged cross-sectional profile along the first direction x, making the structure of the first cladding layer 12 simple and easy to manufacture.

In an embodiment, refer to FIGS. 7 to 11, the first cladding layer 12 can be substantially in the shape of a cantilever beam. The first cladding layer 12 includes a main portion 121, two first connecting portions 122, and a second connecting portion 123. The two first connecting portions 122 are connected to the main portion 121 and extend along the first direction x. Viewed along the thickness direction z, the two first connecting portions 122 are arranged relative to each other along the second direction y; the second connecting portion 123 is connected to the main portion 121 and extends along the first direction x. The second connecting portion 123 is located between the two first connecting portions 122, and the end of the second connecting portion 123 away from the main portion 121 is the light receiving end 14. The transmitting waveguide assembly 13 is embedded in the second connecting portion 123 and the main portion 121. The aforementioned arrangement of the second connecting portion 123 with the transmitting waveguide assembly 13 and the first connecting portion 122 without the transmitting waveguide assembly 13 at intervals can reduce the confinement of the material edge of the first cladding layer 12 on the mode field of the optical signal transmitted in the transmitting waveguide assembly 13 in the second direction y, thereby increasing the mode field size of the transmitting waveguide assembly 13 in the second direction y.

Figure 8:
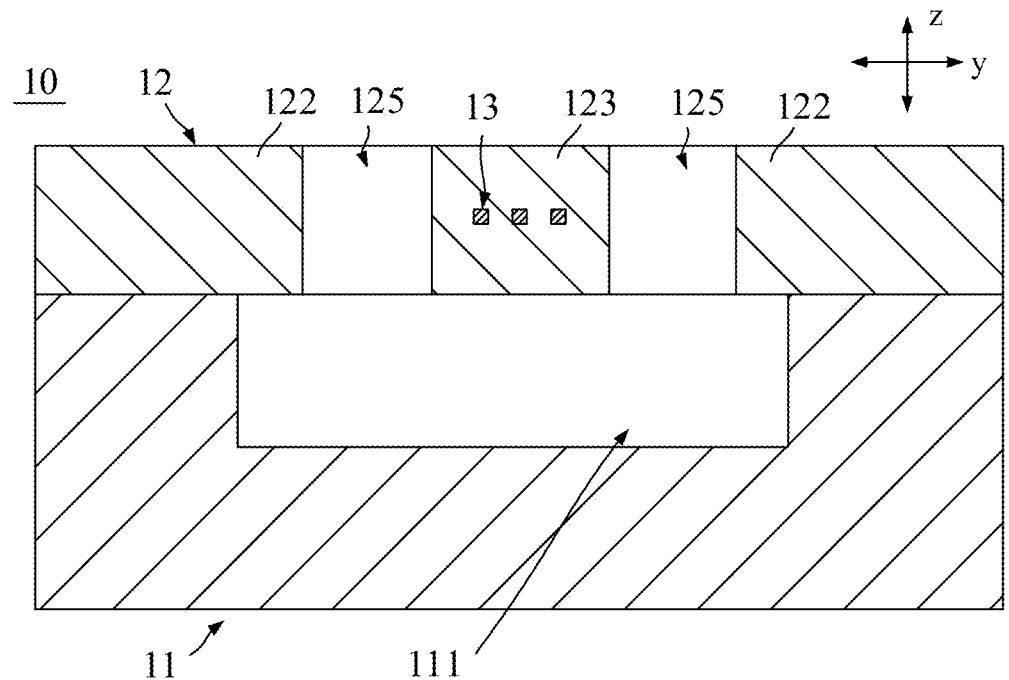
FIG. 8 is a structural schematic diagram in the N-N direction of FIG. 7.

Refer to FIG. 8, the first substrate 11 is provided with a groove 111 corresponding to the second connecting portion 123, making the second connecting portion 123 suspended relative to the first substrate 11. The first substrate 11 is generally made of silicon, and the first cladding layer 12 is generally made of silicon dioxide. The refractive index of the first substrate 11 is generally higher than that of the first cladding layer 12. When the optical signal is coupled into the edge coupler 10 from the aforementioned light receiving end 14, if the aforementioned second connecting portion 123 is in contact with the first substrate 11, part of the optical signal will enter the first substrate 11 for transmission, thereby reducing the proportion of the optical signal coupled into the transmitting waveguide assembly 13. Designing the second connecting portion 123 to be suspended relative to the first substrate 11, with the refractive index of the second connecting portion 123 being higher than that of air, can overcome the aforementioned shortcomings.

Refer to FIGS. 7 to 11, the first cladding layer 12 includes at least one pair of third connecting portions 124. In each pair of third connecting portions 124, one third connecting portion 124 is connected between the second connecting portion 123 and one first connecting portion 122, and the other third connecting portion 124 is connected between the second connecting portion 123 and the other first connecting portion 122. The third connecting portions 124 can strengthen the structural strength of the first cladding layer 12. Each pair of third connecting portions 124 can be symmetrically arranged about the second connecting portion 123, making the structural strength of each part of the first connecting portion 122 approximately balanced.

If the first cladding layer 12 includes multiple pairs of third connecting portions 124, multiple pairs of third connecting portions 124 can be arranged at intervals along the first direction x to further enhance the overall rigidity of the second connecting portion 123. In an embodiment, the first cladding layer 12 includes more than three pairs of third connecting portions 124, and the interval between adjacent pairs of third connecting portions 124 along the first direction x can be equal or unequal.

The through hole 125 is formed between adjacent third connecting portions 124. During manufacturing, the first cladding layer 12 can first be deposited on the first substrate 11, and then multiple through holes 125 can be formed by etching the first cladding layer 12, obtaining the main portion 121, the first connecting portion 122, and the second connecting portion 123, etc. The manufacturing process is simple. The through hole 125 can be connected with the groove 111 of the first substrate 11, making it possible to etch the groove 111 and other parts on the first substrate 11 through the through hole 125.

For the structure of the aforementioned second connecting portion 123, it can also be varied. The following describes the structure of the second connecting portion 123 in some embodiments.

Figure 7:
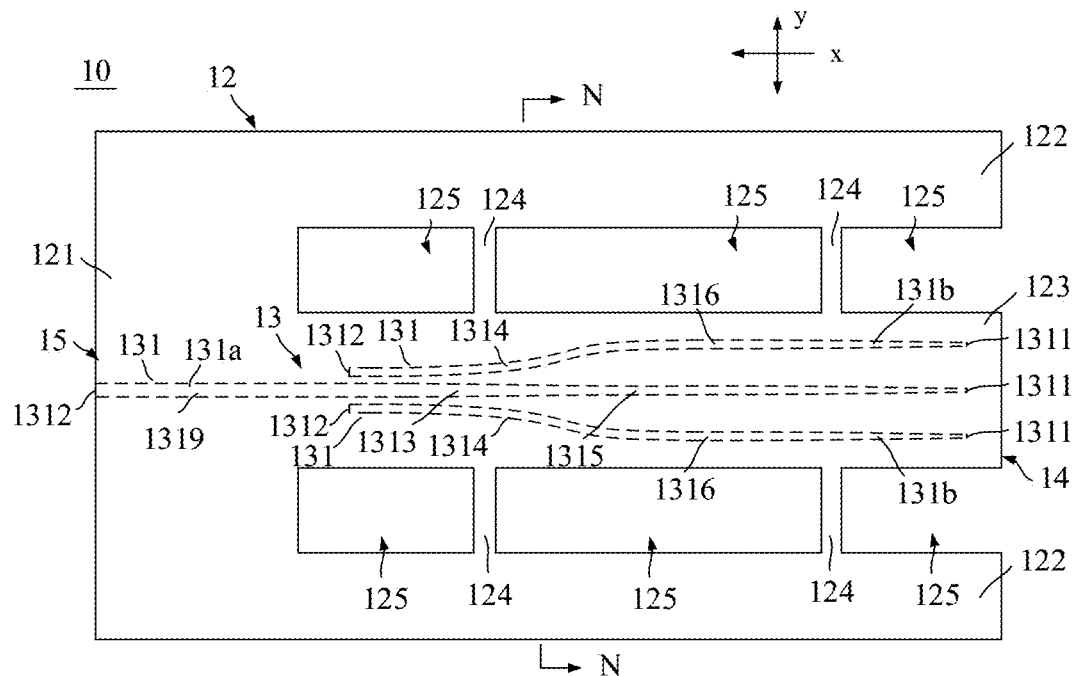
FIG. 7 is a structural schematic diagram of an edge coupler provided by an embodiment.
Figure 9:
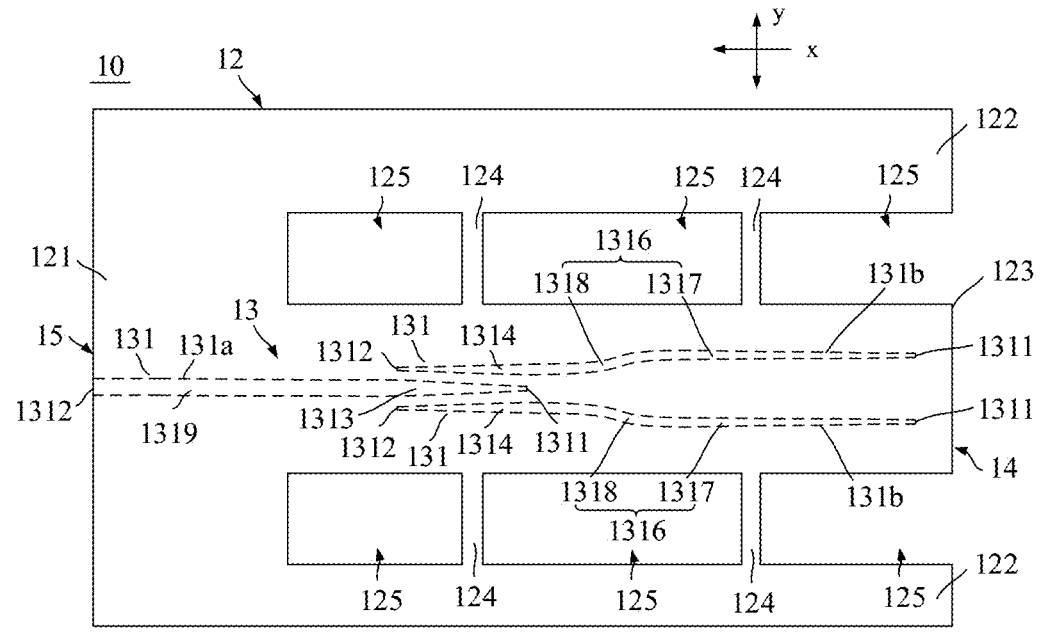
FIG. 9 is a structural schematic diagram of an edge coupler provided by an embodiment.
Figure 10:
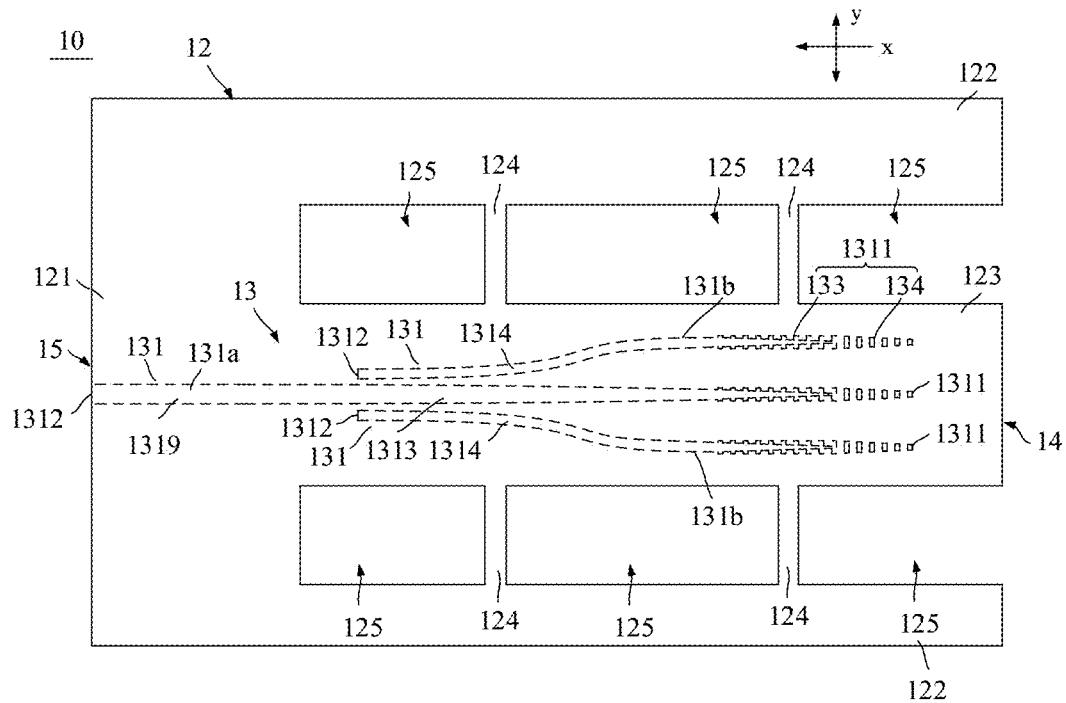
FIG. 10 is a structural schematic diagram of an edge coupler provided by an embodiment.

In an embodiment, refer to FIGS. 7, 9, and 10, the cross-sectional profile of the second connecting portion 123 along the first direction x remains unchanged, reducing the structural complexity of the second connecting portion 123 and its manufacturing cost. Since the arrangement of multiple transmitting waveguides 131 increases the effective mode field of the light receiving end of the edge coupler 10, the shape of the second connecting portion 123 does not need to be complex to meet the requirements.

Figure 11:
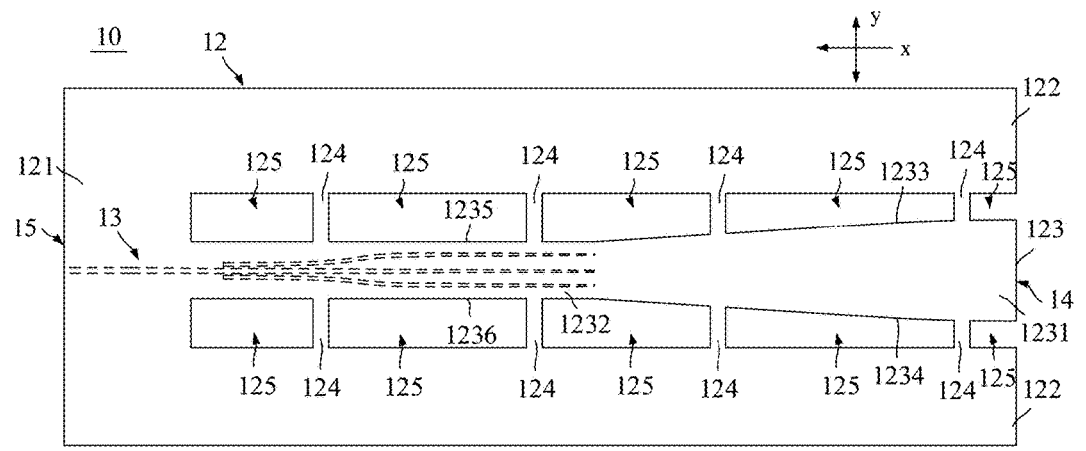
FIG. 11 is a structural schematic diagram of an edge coupler provided by an embodiment.

In an embodiment, refer to FIG. 11, the second connecting portion 123 includes a first sub-part 1231 and a second sub-part 1232. The first sub-part 1231 is located upstream of the optical path of the second sub-part 1232, and the transmitting waveguide assembly 13 is embedded in the second sub-part 1232 and the main portion 121. The first sub-part 1231 forms a segment of the waveguide structure for initial receiving of the optical signal, and the transmitting waveguide assembly 13 forms a segment of the waveguide structure for receiving and transmitting the optical signal.

Where the cross-sectional profile of the first sub-part 1231 gradually decreases along the first direction x. When the optical signal is coupled into the edge coupler 10, the optical signal is first coupled into the first sub-part 1231 and transmitted within it. The initial cross-sectional profile of the first sub-part 1231 is large, which can improve the coupling efficiency of the edge coupler 10. The cross-sectional profile of the first sub-part 1231 gradually decreases along the first direction x, compressing the mode field to a size close to the transmitting waveguide assembly 13, allowing the optical signal to be coupled into the transmitting waveguide assembly 13 of the second sub-part 1232 with high efficiency.

The cross-sectional profile of the first sub-part 1231 gradually decreasing along the first direction x mean that the cross-sectional profile of the first sub-part 1231 gradually decreases with a fixed slope or with a varying slope. Where the cross-sectional profile of the first sub-part 1231 gradually decreasing along the first direction x mean that the width of the first sub-part 1231 gradually decreases along the first direction x. In an embodiment, the width of the first sub-part 1231 can gradually decrease with a fixed slope or with a varying slope, and this is not limited. Where the varying slope can be like the varying rate from small to large and then to small as described above.

Where the cross-sectional profile of the second sub-part 1232 along the first direction x remains unchanged; or, the cross-sectional profile of the second sub-part 1232 gradually decreases along the first direction x. Where the cross-sectional profile of the second sub-part 1232 gradually decreasing along the first direction x allow better coupling of the optical signal into the transmitting waveguide assembly 13.

If the cross-sectional profile of the second sub-part 1232 gradually decreases along the first direction x, viewed along the thickness direction z, the first sub-part 1231 has a first side wall 1233 and a second side wall 1234 facing each other along the second direction y. The second sub-part 1232 has a third side wall 1235 and a fourth side wall 1236 facing each other along the second direction y. The first side wall 1233 and the third side wall 1235 are on one side of the second connecting portion 123, and the acute angle between the first side wall 1233 and the first direction x is greater than the acute angle between the third side wall 1235 and the first direction x; the second side wall 1234 and the fourth side wall 1236 are on the other side of the second connecting portion 123, and the acute angle between the second side wall 1234 and the first direction x is greater than the acute angle between the fourth side wall 1236 and the first direction x. The degree of the cross-sectional profile of the second sub-part 1232 gradually decreasing along the first direction x is relatively gentler compared to the degree of the cross-sectional profile of the first sub-part 1231 gradually decreasing.

In an example, the edge coupler using the single transmitting waveguide input and output scheme has a small light receiving mode field, which has a large difference in size from the mode field of the spatial light, and the coupling loss is very high. The single transmitting waveguide input and output scheme can also be combined with the cantilever beam structure, for example, the first cladding layer can adopt the cantilever beam structure shown in FIGS. 7 to 10, but this scheme still has a very limited improvement in the mode field of the light receiving end of the edge coupler. The single transmitting waveguide input and output scheme can be combined with the multi-section cantilever beam structure. In an example, the cladding layer can adopt the cantilever beam structure shown in FIG. 11 to further expand the mode field of the light receiving end of the edge coupler. However, the mode field of the single transmitting waveguide is very small, and the width of the first cladding layer in the second sub-part 1232 is also very small, so the length of the first sub-part 1231 needs to be set very long to effectively increase the mode field size of the light receiving end of the edge coupler. The scheme of combining the single transmitting waveguide input and output with the cantilever beam structure shown in FIGS. 7 to 10 has a very small mode field at the light receiving end of the edge coupler, resulting in low coupling efficiency. The scheme of combining the single transmitting waveguide input and output with the cantilever beam structure shown in FIG. 11 can increase the mode field of the light receiving end but greatly increases the length of the cantilever beam, thereby significantly reducing the rigidity of the second connecting portion and affecting the overall reliability of the edge coupler.

Compared to the aforementioned single transmitting waveguide input and output scheme, the transmitting waveguide assembly 13 in an embodiment adopts a multi-waveguide input and single-waveguide output scheme. Since the transmitting waveguide assembly 13 effectively increases the mode field of its light receiving end, the mode field of the edge coupler can be increased without extending and expanding the cross-sectional profile of the second connecting portion 123, meeting the requirement of high coupling efficiency. With the same optical coupling efficiency, the transmitting waveguide assembly setting in an embodiment can reduce the length of the cantilever beam waveguide; it can reduce the length of the second connecting portion 123 along the first direction x, and the reduction in length of the second connecting portion 123 along the first direction x improve the overall structural reliability of the edge coupler, making it less likely to break in applications with high vibration intensity such as vehicular use. With the same optical coupling efficiency, the edge coupler 10 with multi-waveguide input and single-waveguide output shown in FIG. 7, can reduce the length of the second connecting portion 123 along the first direction x from 250 um to about 90 um, greatly improving the overall structural reliability of the edge coupler 10.

In an embodiment, the transmitting waveguide assembly 13 adopts a multi-waveguide input and single-waveguide output scheme. With the same process and the same receiving end face size of the transmitting waveguide, the coupling efficiency can be greatly improved, and the fluctuation of coupling efficiency with process tolerance is smaller, resulting in higher process tolerance and stronger mass production capability. In an embodiment, the transmitting waveguides 131 are made of silicon nitride, and the end face width of the light receiving end 14 is 250 nm. Compared to the cantilever beam edge coupler with single-waveguide input and output, the coupling efficiency of the edge coupler 10 with multi-waveguide input and single-waveguide output shown in FIG. 7 will not only be related to parameters such as the width and thickness of a single transmitting waveguide 131, but also to parameters such as the distance between adjacent transmitting waveguides 131. The width, thickness, and other parameters of a single transmitting waveguide 131 are related to the forming process tolerance of the edge coupler 10, and the distance between adjacent transmitting waveguides 131 can be achieved with high precision based on the existing process, thereby reducing the impact of parameters such as the width and thickness of a single transmitting waveguide 131 on the optical coupling efficiency of the edge coupler 10; reducing the impact of process tolerance on the coupling efficiency of the edge coupler 10, improving the process tolerance of the edge coupler 10, and resulting in stronger mass production capability. The coupling efficiency of the edge coupler 10 in an embodiment fluctuates less with process tolerance, improving the process manufacturing tolerance and resulting in stronger mass production capability.

Figure 12:
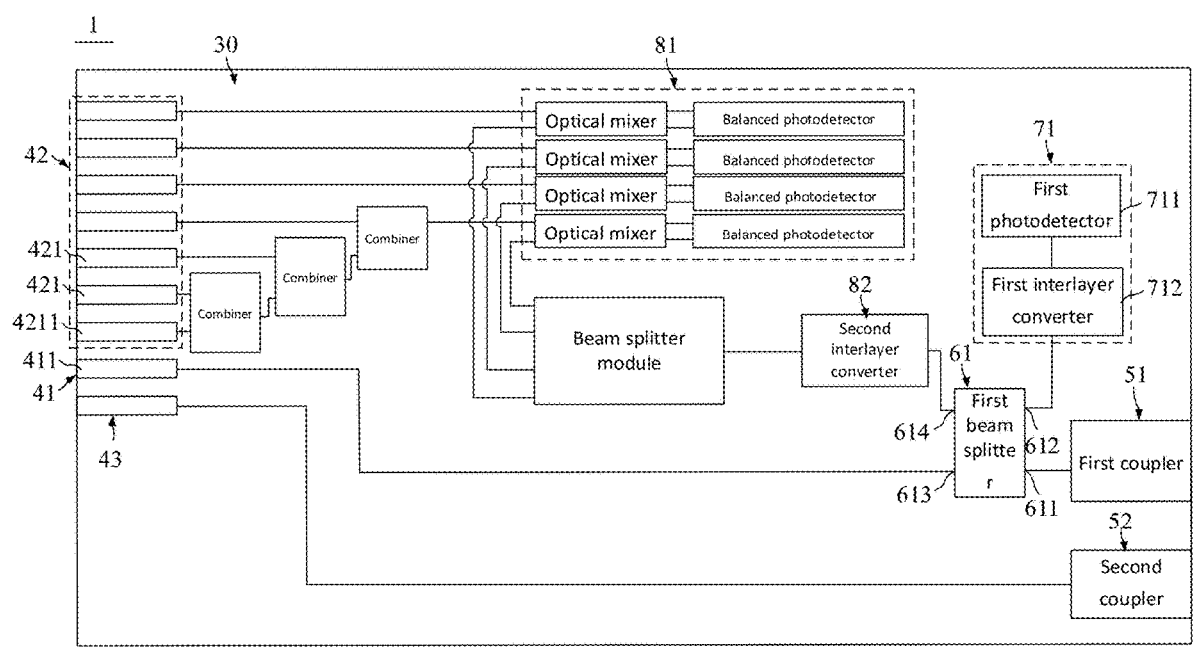
FIG. 12 is a structural schematic diagram of an photonic chip provided by an embodiment.
Figure 13:
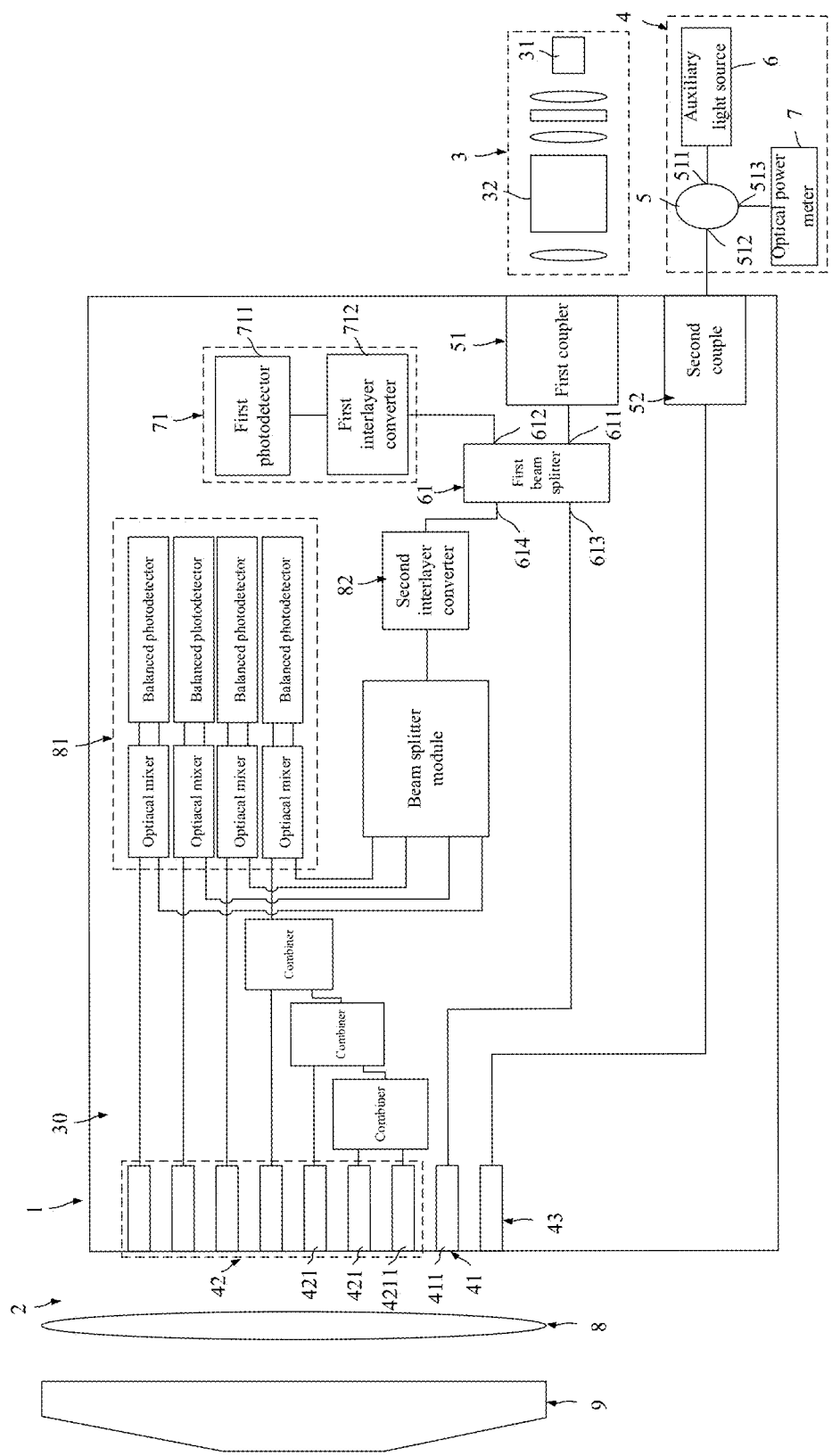
FIG. 13 is a structural schematic diagram of the optical alignment when the photonic chip shown in FIG. 12 is applied to LiDAR.
Figure 14:
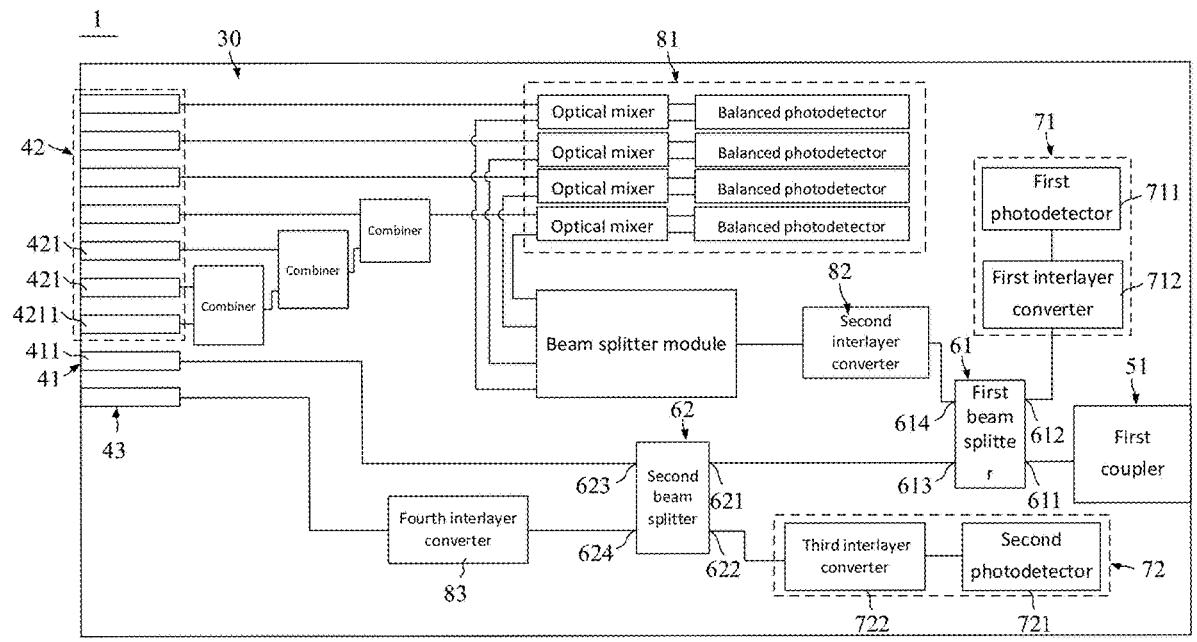
FIG. 14 is a structural schematic diagram of an photonic chip provided by an embodiment.

A second aspect, referring to FIGS. 12 to 14, embodiments of the application provides an photonic chip 1, which can be used in LiDAR. The photonic chip 1 includes the aforementioned edge coupler 10, which receives optical signals from outside the photonic chip 1, allowing the optical signals to enter the photonic chip 1.

In an embodiment, the photonic chip 1 has a first end and a second end along the first direction x, and a third end and a fourth end along the second direction y. The edge coupler 10 is located at the first end, and the optical signal emitted by the emitting waveguide module 41 is emitted to the outside of the photonic chip 1 through one of the second end, the third end, and the fourth end.

The photonic chip 1 includes a substrate, a cladding layer 30 provided on the substrate, and an emitting waveguide module 41 embedded in the cladding layer 30. The emitting waveguide module 41 is connected to the second end 1312 of the first transmitting waveguide 131a in the edge coupler 10, for receiving at least a part of the optical signal output by the edge coupler 10 and emitting it to detect the target object.

The first substrate 11 of the edge coupler 10 is part of the substrate of the photonic chip 1, and the first cladding layer 12 of the edge coupler 10 is part of the cladding layer 30 of the photonic chip 1, making the edge coupler 10 and the photonic chip 1 an integrated structure.

When the photonic chip 1 is used in LiDAR 2, optically aligned with the transceiver lens 8 in the LiDAR 2 to ensure that the focal plane of the transceiver lens 8 coincides with or is within the preset range of the emitting end face of the emitting waveguide 411, before assembly and fixation. The optical alignment between the photonic chip 1 and the transceiver lens 8 includes: the emitting end of the emitting waveguide module 41 of the photonic chip 1 is located on the focal plane of the transceiver lens 8, and the emission direction of the emitting waveguide module 41 is parallel to the optical axis of the transceiver lens 8.

When the photonic chip 1 and the transceiver lens 8 are optically aligned, a light reflector 9 can be provided on the side of the transceiver lens 8 away from the photonic chip 1. The light emitted by the emitting waveguide module 41 is collimated after passing through the transceiver lens 8, then reaches the light reflector 9, and the light reflected by the light reflector 9 is focused again through the transceiver lens 8 and coupled back to the emitting waveguide module 41. This process, known as "self-emission and self-receiving," involves adjusting the positions of the transceiver lens 8 and the light reflector 9. If the power of the return light received by the emitting waveguide module 41 reaches its maximum, it is considered that the transceiver lens 8 and the emitting waveguide module 41 of the photonic chip 1 are aligned in the optimal position and can be fixed. The emitted light beam passing through the transceiver lens 8 is collimated.

To monitor the optical power of the return light received by the emitting waveguide module 41, an external circulator is usually used for monitoring, such as connecting a circulator to the edge coupler 10 shown in FIG. 12 to monitor the return light power through a port next to the first coupler 51. However, in some cases, it is not possible to connect a circulator to the edge coupler 10. For example, before the optical adjustment process, the edge coupler 10 may have already coupled with upstream optical components via free space optics, making it difficult to detect the return light power. In an embodiment, an photonic chip 1 monitor the optical power of the return light received by the emitting waveguide module 41 through the first optical adjusting monitoring module 71 integrated on the photonic chip 1 is disclosed, to overcome the aforementioned shortcomings.

In an embodiment, refer to FIG. 12. The photonic chip 1 has a first coupler 51, a first beam splitter 61 embedded in the cladding layer 30, an emitting waveguide module 41 embedded in the cladding layer 30, and a first optical adjusting monitoring module 71 provided on the cladding layer 30. The first coupler 51 is used to receive a first optical signal from outside the photonic chip 1, allowing the first optical signal to enter the photonic chip 1. The first coupler 51 can be the aforementioned edge coupler 10 or other couplers, such as a vertical grating coupler, etc.

The first beam splitter 61 includes a first port 611, a second port 612, a third port 613, and a fourth port 614. The first beam splitter 61 is configured to output an optical signal input through the first port 611 via the third port 613 and the fourth port 614, and to output an optical signal input through the third port 613 via the first port 611 and the second port 612. The first port 611 is connected to the first coupler 51 and is used to receive the first optical signal output by the first coupler 51. The third port 613 is connected to the emitting waveguide module 41, which is used to transmit at least a part of the first split optical signal and emit it. The first split optical signal is the signal output through the third port 613 of the first beam splitter 61 by the first optical signal. The second port 612 is connected to the first optical adjusting monitoring module 71, which includes a first photodetector 711.

In an embodiment, the multiple ports of the first beam splitter 61 are used to connect with the emitting waveguide module 41, the first coupler 51, and the first optical adjusting monitoring module 71. This configuration allows at least a part of the first optical signal received by the first coupler 51 to be emitted via the emitting waveguide module 41, and after being reflected by the light reflector 9, to be received by the emitting waveguide module 41 again. The return light received by the emitting waveguide module 41 can pass through the first beam splitter 61 and reach the first optical adjusting monitoring module 71. The first photodetector 711 in the first optical adjusting monitoring module 71 can provide real-time feedback on the optical power of the return light to obtain the maximum optical power of the return light, thereby determining the optimal position of the transceiver lens 8 and the photonic chip 1 based on the maximum optical power of the return light. The first photodetector 711 can provide feedback on the optical power of the return light through the photocurrent. If the photocurrent of the first photodetector 711 reaches its maximum, the optical power of the return light has reached its maximum, and the transceiver lens 8 and the photonic chip 1 are adjusted to the optimal position and can be fixed.

In an embodiment, the first coupler 51, the first beam splitter 61, and the emitting waveguide module 41 are located in the same waveguide layer along the thickness direction of the photonic chip 1, a silicon nitride waveguide layer, to ensure that the optical signal can be transmitted into the photonic chip 1 with high optical power. The first photodetector 711 and the first beam splitter 61 are located in different waveguide layers along the thickness direction of the photonic chip 1, the first photodetector 711 is located in a silicon waveguide layer, to facilitate reducing the manufacturing difficulty of the photonic chip. The first optical adjusting monitoring module 71 includes a first interlayer converter 712, which is connected to the second port 612 and the first photodetector 711, respectively, to allow the optical signal output through the second port 612 to be transmitted to the first photodetector 711. The thickness direction of the photonic chip 1 is consistent with the thickness direction of the edge coupler 10.

The first photodetector 711 and the first beam splitter 61 can be located in the same waveguide layer along the thickness direction of the photonic chip 1, in an embodiment, the first beam splitter 61, the emitting waveguide module 41, and the first photodetector 711 are all located in the silicon waveguide layer. The first optical adjusting monitoring module 71 does not need to be provided with the first interlayer converter 712, which connects the second port 612 and the first photodetector 711, simplifying the structure of the first optical adjusting monitoring module 71.

When the LiDAR 2 is in use, the optical signal emitted by the emitting waveguide module 41 of the photonic chip 1 to detect the target object. It is necessary to ensure that the optical power of the optical signal emitted by the emitting waveguide module 41 is sufficient to improve detection performance. The proportion of the optical signal input through the first port 611 of the first beam splitter 61 and output through the fourth port 614 can be greater than or equal to 0.5% and less than or equal to 5%, while the remaining optical signal from the first port 611 is output through the third port 613, ensuring that the optical power of the optical signal output through the third port 613 is sufficient and that the optical power of the optical signal emitted by the emitting waveguide module 41 is sufficient. The proportion of the optical signal input through the third port 613 of the first beam splitter 61 and output through the second port 612 can be greater than or equal to 0.5% and less than or equal to 5%. The first optical adjusting monitoring module 71 receives a small portion of the return light and monitors the optical power of the return light in real-time. The setting of the first optical adjusting monitoring module 71 almost does not affect the overall performance of the photonic chip 1.

The first beam splitter 61 can be any device with a splitting function and multiple input and output ports, such as a directional coupler.

The photonic chip 1 can be configured for both transmitting and receiving, meaning that the photonic chip 1 can emit detection optical signals to detect target objects and receive echo optical signals formed by the reflected detection optical signals from the target object, thereby enhancing the integration of the LiDAR using it. Specifically, the photonic chip 1 includes a receiving waveguide module 42 and a photoelectric detection module 81.

The receiving waveguide module 42 is embedded in the cladding layer 30 and is used to receive echo optical signals. Considering that the silicon waveguide process is more mature than the silicon nitride waveguide process, the receiving waveguide module 42 can be located in the silicon waveguide layer. In an embodiment, the receiving waveguide module 42 is located in the same silicon waveguide layer as the aforementioned first photodetector 711. The photoelectric detection module 81 is embedded in the cladding layer 30 and is connected to the receiving waveguide module 42 and the fourth port 614, respectively, to receive the echo optical signal and the second split optical signal. The second split optical signal is the signal output through the fourth port 614 of the first beam splitter 61 by the first optical signal. Similarly, the photoelectric detection module 81 can be located in the same waveguide layer as the receiving waveguide module 42, for example, the same silicon waveguide layer.

Connecting the fourth port 614 of the first beam splitter 61 to the photoelectric detection module 81 allows the fourth port 614 to transmit the second split optical signal to the photoelectric detection module 81, and this second split optical signal can be used as the local oscillator optical signal. By transmitting the local oscillator optical signal to the photoelectric detection module 81 through the first beam splitter 61, the various ports of the first beam splitter 61 can be fully utilized. Compared to additionally setting a coupler on the photonic chip 1 and transmitting the local oscillator optical signal to the photoelectric detection module 81 through this coupler, this can simplify the structure of the photonic chip 1 and reduce the manufacturing cost of the photonic chip 1.

In an embodiment, the first beam splitter 61 and the photoelectric detection module 81 are located in different waveguide layers of the photonic chip 1 along the thickness direction. Accordingly, the photonic chip 1 includes a second interlayer converter 82. The second interlayer converter 82 is connected to the forth port 614 and the photoelectric detection module 81, respectively, allowing the optical signal output through the forth port 614 of the first beam splitter 61 to be transmitted to the photoelectric detection module 81.

in an embodiment, the first beam splitter 61 and the photoelectric detection module 81 can be located in the same waveguide layer of the photonic chip 1 along the thickness direction, such as in the same silicon waveguide layer or in the same silicon nitride waveguide layer. In this case, there is no need to design a second interlayer converter 82 connecting the first beam splitter 61 and the photoelectric detection module 81, which can simplify the structure of the photonic chip 1.

The photoelectric detection module 81 includes an optical mixer and a balanced photodetector. The optical mixer has two input ports, one for receiving the local oscillator optical signal and the other for receiving the echo optical signal. In this way, the local oscillator optical signal and the echo optical signal can beat in it to obtain two beat frequency signals, namely the first beat frequency optical signal and the second beat frequency optical signal. In an embodiment, the optical mixer is a 180-degree optical mixer, and the phase difference between the two optical signals it outputs is 180 degrees. The balanced photodetector is connected to the two outputs of the optical mixer and is used for balanced detection of the first beat frequency optical signal and the second beat frequency optical signal, and outputting the first beat frequency signal, whose frequency is consistent with that of the first/second beat frequency optical signals. Although this embodiment uses the photoelectric detection module 81 including an optical mixer and a balanced photodetector, the photoelectric detection module can receive the local oscillator optical signal and the echo optical signal and convert their beat frequency signals into electrical signals. in an embodiment, the photoelectric detection module includes a photodetector, which is used to receive the local oscillator optical signal and the echo optical signal, to beat the two, and convert the resulting beat frequency optical signal into an electrical signal, namely the first beat frequency signal.

The emitting waveguide module 41 includes an emitting waveguide 411, and the receiving waveguide module 42 includes at least two receiving waveguides 421. Along the thickness direction of the photonic chip 1, the receiving waveguides 421 are located on the same side of the emitting waveguide 411. The thickness direction of the photonic chip 1 can be parallel to the thickness direction z of the edge coupler 10. Along the thickness direction z, the emitting waveguide module 41 and the receiving waveguide module 42 can be arranged oppositely along the second direction y, and at least two receiving waveguides 421 in the receiving waveguide module 42 can be arranged oppositely along the second direction y.

The receiving waveguide 421 closest to the emitting waveguide 411 among the at least two receiving waveguides 421 is defined as the first receiving waveguide 4211. In an embodiment, the photonic chip 1 also includes an auxiliary waveguide 43 embedded in the cladding layer 30. The auxiliary waveguide 43 and the receiving waveguide 421 are located in the same waveguide layer of the photonic chip 1 along the thickness direction and are located on the side of the emitting waveguide 411 away from the receiving waveguide module 42. The auxiliary waveguide 43, the first receiving waveguide 4211, and the emitting waveguide 411 are arranged in parallel. Since a small amount of optical signal will couple into the first receiving waveguide 4211 during the transmission of the optical signal by the emitting waveguide 411 and will be emitted through the first receiving waveguide 4211, this will cause the light spot shape of the optical signal emitted by the emitting waveguide module 41 to be asymmetric. By setting the auxiliary waveguide 43 on the side of the emitting waveguide 411 away from the receiving waveguide 421, the optical signal overflowing from the emitting waveguide 411 can couple into the receiving waveguide 421 (e.g., the first receiving waveguide 4211) as well as into the auxiliary waveguide 43, and be emitted through the emitting waveguide module 41, the first receiving waveguide 4211, and the auxiliary waveguide 43, making the light spot of the optical signal emitted by the emitting waveguide 411 roughly symmetrical in the second direction y, thereby improving detection performance to some extent.

In an embodiment, along the thickness direction z, the distance between the first receiving waveguide 4211 and the emitting waveguide 411 is equal to the distance between the auxiliary waveguide 43 and the emitting waveguide 411. Along the thickness direction z, the distance between the first receiving waveguide 4211 and the emitting waveguide 411 in the second direction y is equal to the distance between the auxiliary waveguide 43 and the emitting waveguide 411 in the second direction y. This ensures a symmetrical mode field of the light spot of the emitting waveguide 411 in the second direction y.

Since the distance between the auxiliary waveguide 43 and the first receiving waveguide 4211 relative to the emitting waveguide 411 is equal, the auxiliary waveguide 43 are used to align the receiving waveguide module 42 with the transceiver lens 8 optically. The optical alignment of the receiving waveguide module 42 and the transceiver lens 8 includes: the light-receiving end of the receiving waveguide module 42 is located on the focal plane of the transceiver lens 8, and the light-receiving direction of the receiving waveguide module 42 is parallel to the optical axis of the transceiver lens 8.

In an embodiment, referring to FIG. 13, the photonic chip 1 includes a second coupler 52, which is used to receive a second optical signal from outside the photonic chip 1, allowing the second optical signal to enter the photonic chip 1. The auxiliary waveguide 43 is connected to the second coupler 52. By setting the second coupler 52 connected to the auxiliary waveguide 43, the second optical signal can be transmitted to the auxiliary waveguide 43 and emitted from the auxiliary waveguide 43. The emitted light of the auxiliary waveguide 43 is collimated after passing through the transceiver lens 8, then reaches the light reflector 9, and the light reflected by the light reflector 9 is focused again through the transceiver lens 8 and coupled back to the auxiliary waveguide 43. This process, known as "self-emission and self-receiving," involves adjusting the positions of the transceiver lens 8 and the light reflector 9. If the optical power of the return light received by the auxiliary waveguide 43 reaches its maximum, it is considered that the transceiver lens 8, the auxiliary waveguide 43, and the receiving waveguide module 42 are aligned in the optimal position and can be fixed.

To monitor the optical power of the return light received by the auxiliary waveguide 43 and to check whether the optical power of the return light has reached its maximum, a third optical adjusting monitoring module 4 can be externally connected through the second coupler 52. The third optical adjusting monitoring module 4 includes a circulator 5, an auxiliary light source 6, and an optical power meter 7. The circulator 5 includes a ninth port 511, a tenth port 512, and an eleventh port 513. The circulator 5 is configured to output an optical signal entering through the ninth port 511 via the tenth port 512, and to output an optical signal entering through the tenth port 512 via the eleventh port 513. The ninth port 511 is connected to the auxiliary light source 6, the tenth port 512 is connected to the second coupler 52, and the eleventh port 513 is connected to the optical power meter 7. The optical signal generated by the auxiliary light source 6 can pass through the second optical signal via the ninth port 511, the tenth port 512 of the circulator 5, and the second coupler 52 to reach the auxiliary waveguide 43, and then be transmitted to the transceiver lens 8 and the light reflector 9 by the auxiliary waveguide 43. The light reflected by the light reflector 9 passes through the transceiver lens 8, and after passing through the auxiliary waveguide 43, the second coupler 52, and the tenth port 512 and the eleventh port 513 of the circulator 5, it is output to the optical power meter 7. The optical power meter 7 can monitor whether the optical power of the return light has reached its maximum.

The third optical adjusting monitoring module 4 is used when aligning the receiving waveguide module 42 with the transceiver lens 8, and after the optical alignment of the receiving waveguide module 42 with the transceiver lens 8 is completed, the photonic chip 1 and the third optical adjusting monitoring module 4 will be disconnected. The third optical adjusting monitoring module 4 is an auxiliary device external to the photonic chip 1 and the LiDAR 2.

The second coupler 52 can be the aforementioned edge coupler 10 or other couplers, such as a vertical grating coupler.

in an embodiment, referring to FIG. 14, the photonic chip 1 includes a second beam splitter 62 embedded in the cladding layer 30 and a second optical adjusting monitoring module 72 provided on the cladding layer 30. The second beam splitter 62 includes a fifth port 621, a sixth port 622, a seventh port 623, and an eighth port 624. The second beam splitter 62 is configured to output an optical signal input through the fifth port 621 via the seventh port 623 and the eighth port 624, and to output an optical signal input through the seventh port 623 via the fifth port 621 and the sixth port 622, and to output an optical signal input through the eighth port 624 via the fifth port 621 and the sixth port 622. The fifth port 621 is connected to the third port 613 of the first beam splitter 61, the seventh port 623 is connected to the emitting waveguide module 41, the eighth port 624 is connected to the auxiliary waveguide 43, and the sixth port 622 is connected to the second optical adjusting monitoring module 72, which includes a second photodetector 721.

In an embodiment, the multiple ports of the second beam splitter 62 are used to connect with the first beam splitter 61, the emitting waveguide module 41, the auxiliary waveguide 43, and the second optical adjusting monitoring module 72. This configuration allows at least a part of the first optical signal received by the first coupler 51 to be transmitted to the second beam splitter 62 through the first beam splitter 61, and then transmitted to the emitting waveguide module 41 and the auxiliary waveguide 43. This allows the auxiliary waveguide 43 to be optically aligned with the transceiver lens 8 using the first optical signal received by the first coupler 51, without the need to specially set up a second coupler connected to the auxiliary waveguide 43.

The optical signal emitted by the auxiliary waveguide 43 passes through the transceiver lens 8 and the light reflector 9, and the light reflected by the light reflector 9 is received by the auxiliary waveguide 43, and after passing through the second beam splitter 62, it reaches the second optical adjusting monitoring module 72. The second photodetector 721 in the second optical adjusting monitoring module 72 can provide real-time feedback on the optical power of the return light to obtain the maximum optical power of the return light, thereby determining the optimal position of the transceiver lens 8, the auxiliary waveguide 43, and the receiving waveguide module 42 of the photonic chip 1 based on the maximum optical power of the return light. The second photodetector 721 can provide feedback on the optical power of the return light through the photocurrent. If the photocurrent of the second photodetector 721 reaches its maximum, it is considered that the optical power of the return light has reached its maximum, and the transceiver lens 8, the auxiliary waveguide 43, and the receiving waveguide module 42 of the photonic chip 1 are adjusted to the optimal position and can be fixed.

The setting of the second beam splitter 62 ensures that the optical signal received by the first coupler 51 is transmitted to the emitting waveguide module 41 through the first beam splitter 61, and to the auxiliary waveguide 43 through the first beam splitter 61 and the second beam splitter 62. The optical signal in the auxiliary waveguide 43 is not only coupled by the emitting waveguide module 41. Therefore, compared with the optical signal in the first receiving waveguide 4211, the optical power of the optical signal in the auxiliary waveguide 43 will have some differences, resulting in a slight asymmetry in the light spot emitted by the emitting waveguide module 41 in the second direction y. Due to the small deviation, it can still achieve a roughly symmetrical effect. The second beam splitter 62, similar to the aforementioned first beam splitter 61, can be any device with a splitting function and multiple input and output ports, such as a directional coupler.

In an embodiment, the second beam splitter 62 and the first beam splitter 61 are located in the same waveguide layer along the thickness direction of the photonic chip 1. The second photodetector 721 and the aforementioned first photodetector 711 are located in the same waveguide layer along the thickness direction of the photonic chip 1, while the second beam splitter 62 is located in a different waveguide layer. The second optical adjusting monitoring module 72 includes a third interlayer converter 722, which is connected to the sixth port 622 and the second photodetector 721, respectively. The third interlayer converter 722 allows the optical signal output by the sixth port 622 to be transmitted to the second photodetector 721. The auxiliary waveguide 43 and the second beam splitter 62 are located in different waveguide layers along the thickness direction of the photonic chip 1. The photonic chip 1 includes a fourth interlayer converter 83, which is connected to the eighth port 624 and the auxiliary waveguide 43, respectively. The fourth interlayer converter 83 allows the optical signal output by the eighth port 624 to be transmitted to the auxiliary waveguide 43. In an embodiment, the second beam splitter 62 and the second photodetector 721 can be located in the same waveguide layer along the thickness direction of the photonic chip 1. In this case, there is no need to set up a third interlayer converter 722 connecting the second beam splitter 62 and the second photodetector 721, simplifying the structure of the photonic chip 1. In an embodiment, the second beam splitter 62 and the auxiliary waveguide 43 can be located in the same waveguide layer along the thickness direction of the photonic chip 1. In this case, there is no need to set up a fourth interlayer converter 83 connecting the second beam splitter 62 and the auxiliary waveguide 43, simplifying the structure of the photonic chip 1.

When the LiDAR 2 is in use, the optical signal emitted by the emitting waveguide module 41 of the photonic chip 1 to detect the target object. It is necessary to ensure that the optical power of the optical signal emitted by the emitting waveguide module 41 is sufficient to improve detection performance. The proportion of the optical signal input through the fifth port 621 of the second beam splitter 62 and output through the eighth port 624 can be greater than or equal to 0.1% and less than or equal to 1%, while the remaining optical signal from the fifth port 621 is output through the seventh port 623, ensuring that the optical power of the optical signal output through the seventh port 623 is sufficient and that the optical power of the optical signal emitted by the emitting waveguide module 41 is sufficient. The proportion of the optical signal input through the seventh port 623 of the second beam splitter 62 and output through the sixth port 622 can be greater than or equal to 0.1% and less than or equal to 1%, while the remaining optical signal from the seventh port 623 is output through the fifth port 621, ensuring that the optical power of the optical signal output through the fifth port 621 is sufficient, and ensuring that most of the return light returning through the emitting waveguide module 41 reaches the first beam splitter 61, allowing the first optical adjusting monitoring module 71 to receive the return light returning through the emitting waveguide module 41 and provide feedback on its optical power. The proportion of the optical signal input through the eighth port 624 of the second beam splitter 62 and output through the fifth port 621 can be greater than or equal to 0.1% and less than or equal to 1%, while the remaining optical signal from the eighth port 624 is output through the sixth port 622, ensuring that the optical power of the optical signal output through the sixth port 622 is sufficient, and ensuring that most of the return light returning through the auxiliary waveguide 43 reaches the second optical adjusting monitoring module 72, allowing the second optical adjusting monitoring module 72 to provide feedback on the optical power of the return light returning through the auxiliary waveguide 43.

The position of the second beam splitter 62 can be adjusted and is not limited to being set downstream of the third port 613 of the first beam splitter 61. In an embodiment, the second beam splitter 62 can also be set between the first port 611 of the first beam splitter 61 and the first coupler 51.

In an embodiment, the steps for optical alignment between the photonic chip 1 and the transceiver lens 8 include: optically aligning the emitting waveguide module 41 with the transceiver lens 8, optically aligning the receiving waveguide module 42 with the transceiver lens 8, and rechecking the optical alignment between the emitting waveguide module 41 and the transceiver lens 8 to ensure that the emitting waveguide module 41 remains aligned with the transceiver lens 8.

A third aspect of this embodiment of the application provides a LiDAR 2, refer to FIG. 13, where the LiDAR 2 can be an FMCW (Frequency Modulated Continuous Wave) LiDAR, etc. FMCW LiDAR can be widely used in scenarios such as intelligent connected vehicles, vehicle-road coordination, and intelligent robots. FMCW LiDAR is a high-performance LiDAR based on linear frequency modulation light source and coherent receiving technology, with advantages such as high receiving sensitivity and strong resistance to ambient light interference.

The LiDAR 2 includes a light source module 3 and the aforementioned photonic chip 1. The light source module 3 is used to generate optical signals, and the photonic chip 1 is used to receive optical signals through the edge coupler 10 and emit at least a part of the optical signals through the emitting waveguide module 41 to detect the target object.

The optical signal generated by the laser 31 of the light source module 3 can be amplified by the optical amplifier 32 and then transmitted to the first coupler 51 of the photonic chip 1, which can be the aforementioned edge coupler 10.

Figure 15:
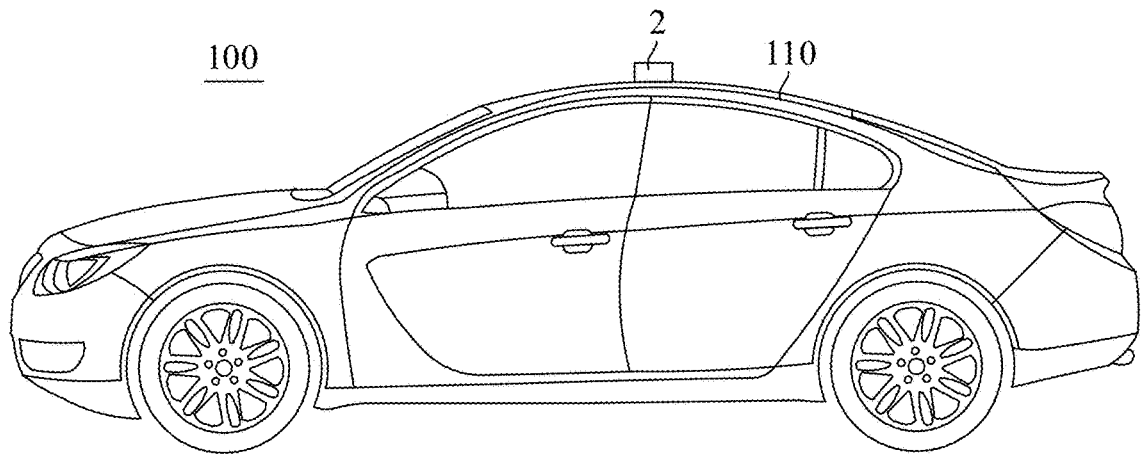
FIG. 15 is a structural schematic diagram of a mobile device provided by an embodiment.

A fourth aspect, referring to FIG. 15, embodiment of the application provides a mobile device 100. The mobile device 100 includes a movable body 110 and the aforementioned LiDAR 2, with the LiDAR 2 mounted on the body 110. In some embodiments, the mobile device 100 is a vehicle, with the body 110 being the vehicle body, and the LiDAR 2 mounted on the vehicle body. The mobile device 100 can be a device other than a vehicle that is equipped with the LiDAR 2, such as a drone, a robot, etc.

Figure 16:
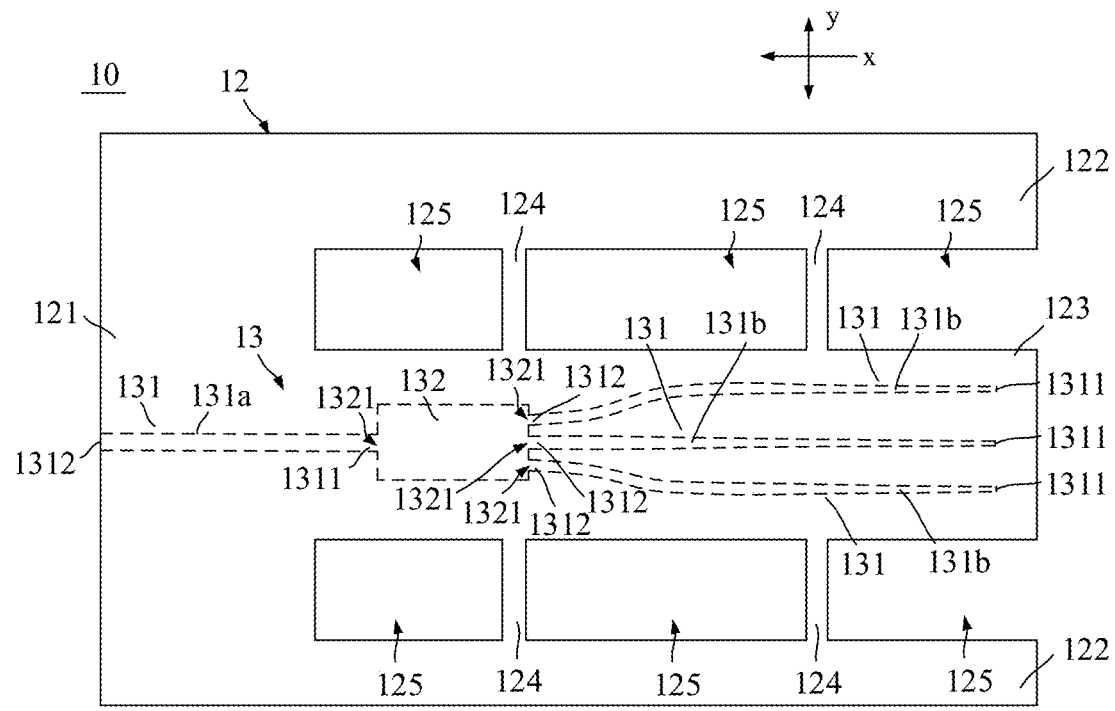
FIG. 16 is a structural schematic diagram of an edge coupler provided by an embodiment.
Figure 17:
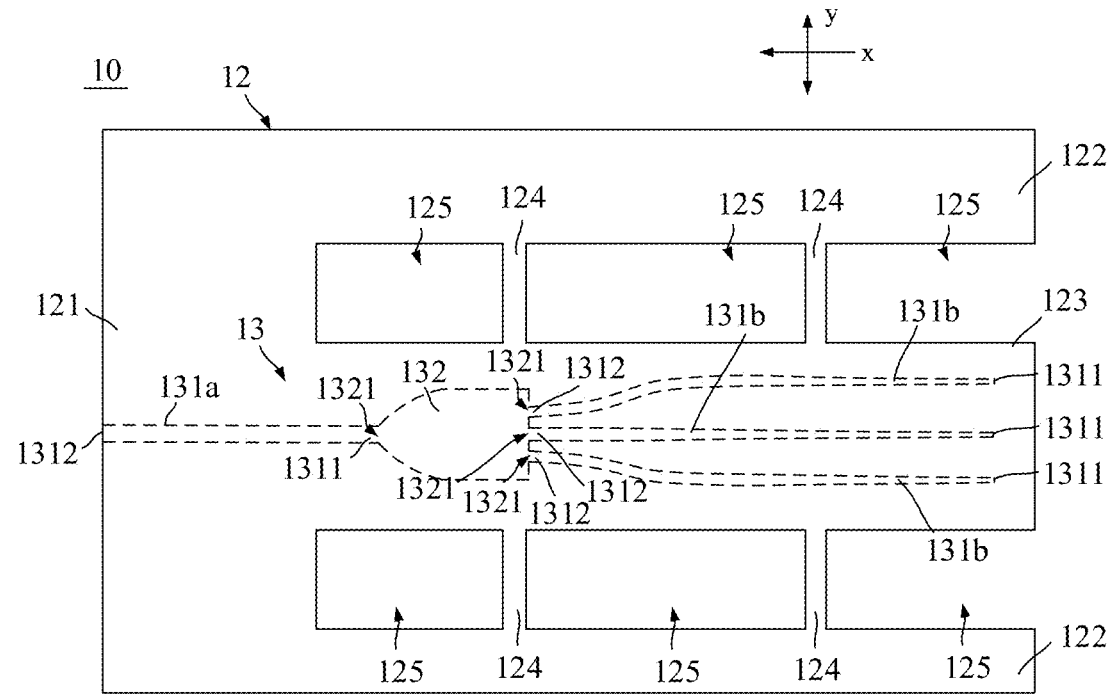
FIG. 17 is a structural schematic diagram of an edge coupler provided by an embodiment.
Figure 18:
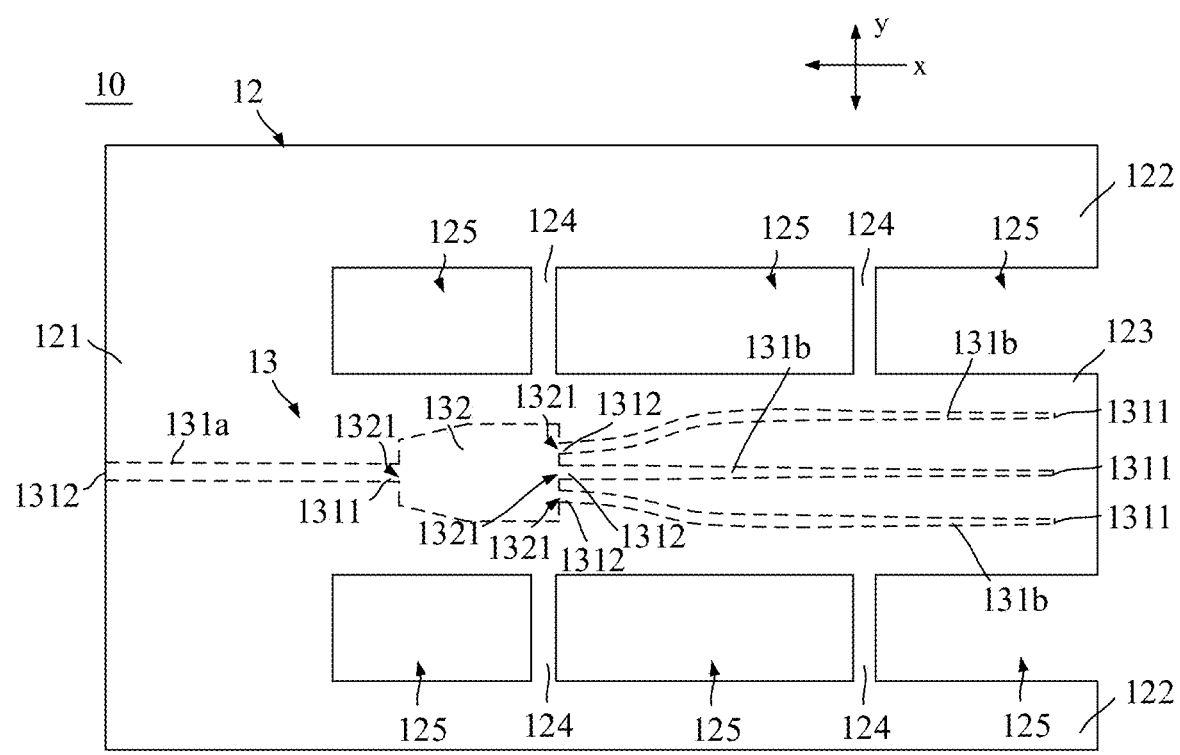
FIG. 18 is a structural schematic diagram of an edge coupler provided by an embodiment.

Referring to FIGS. 16 to 18, the transmission waveguide assembly 13 includes at least three transmission waveguides 131 and a combiner 132. The at least three transmission waveguides 131 include at least two second transmission waveguides 131b and a first transmission waveguide 131a. Along the thickness direction z of the edge coupler 10, the second transmission waveguides 131b are arranged at intervals along the second direction y. The combiner 132 has multiple input ends 1321 and one output end 1322. Each input end 1321 is connected to the second end 1312 of one second transmission waveguide 131b, and the output end 1322 is connected to the first end 1311 of the first transmission waveguide 131a. The transmission waveguide assembly 13 is configured to receive optical signals through the first ends 1311 of at least two second transmission waveguides 131b and output the optical signals through the second end 1312 of the first transmission waveguide 131a. The transmission waveguide assembly 13 achieve multiple waveguide inputs and single waveguide output, improving the light receiving area and light reception of the transmission waveguide assembly 13, reducing optical loss compared to the single waveguide input and single waveguide output in related technology. The process of forming multiple transmission waveguides 131 within the edge coupler 10 is simple and has low manufacturing costs.

The combiner 132 can be device that can combine at least two optical signals and output them. For example, the combiner 132 can be a multi-mode interference (MMI) coupler.

The terms "first," "second," etc., are used for descriptive purposes only and should not be understood as indicating or implying relative importance. Unless otherwise stated, "multiple" means at least two, such as two, three, four, etc. "And/or" describes the association relationship between associated objects, indicating that there can be three relationships, for example, A and/or B can mean: A alone, A and B together, B alone. The character "/" generally indicates that the associated objects before and after are in an "or" relationship.

What is claimed is:

1. A photonic chip, wherein the photonic chip has a first coupler, and the first coupler is configured to receive a first optical signal from outside the photonic chip, so that the first optical signal enters the photonic chip, and the photonic chip comprises:
    a substrate;
    a cladding layer provided on the substrate;
    a first beam splitter embedded in the cladding layer, the first beam splitter comprising a first port, a second port, a third port, and a fourth port, wherein the first beam splitter is configured to output a light signal input from the first port through the third port and the fourth port, and to output a light signal input from the third port through the first port and the second port, the first port is connected to the first coupler and is configured to receive the first optical signal output by the first coupler;
    an emitting waveguide module embedded in the cladding layer and connected to the third port, wherein the emitting waveguide module is configured to transmit at least a part of a first split light signal and emit the at least the part of first split light signal, and the first split light signal is a signal output by the first optical signal through the third port of the first beam splitter;
    a receiving waveguide module embedded in the cladding layer and configured to receive an echo light signal, wherein the echo light signal is formed by the first split light signal being reflected by a target object:
    a photoelectric detection module embedded in the cladding layer and connected to the receiving waveguide module and the fourth port, wherein the photoelectric detection module is configured to receive the echo light signal and a second split light signal, and the second split light signal is a signal output by the first optical signal through the fourth port of the first beam splitter; and
    a first optical adjusting monitoring module provided on the cladding layer and connected to the second port, wherein the first optical adjusting monitoring module comprises a first photodetector, wherein the first optical adjusting monitoring module monitor an optical power of a return light received by the emitting waveguide module.

2. The photonic chip according to claim 1, wherein the first beam splitter and the emitting waveguide module are located in the same waveguide layer along a thickness direction of the photonic chip, and the first photodetector and the first beam splitter are located in different waveguide layers along the thickness direction of the photonic chip; and the first optical adjusting monitoring module comprises a first interlayer converter, and the first interlayer converter is connected to the second port and the first photodetector respectively.

3. The photonic chip according to claim 1, wherein
the receiving waveguide module and the photoelectric detection module are located in the same waveguide layer of the photonic chip along the thickness direction of the photonic chip, and the first beam splitter and the photoelectric detection module are located in different waveguide layers of the photonic chip along the thickness direction of the photonic chip; and the photonic chip further comprises a second interlayer converter, and the second interlayer converter is connected to the forth port and the photoelectric detection module respectively.

4. The photonic chip according to claim 1, wherein
the emitting waveguide module comprises an emitting waveguide, the receiving waveguide module comprises at least two receiving waveguides, and when viewed along the thickness direction of the photonic chip, each of the at least two receiving waveguides is located on the same side of the emitting waveguide, and the receiving waveguide among the at least two receiving waveguides that is closest to the emitting waveguide is a first receiving waveguide; and the photonic chip further comprises an auxiliary waveguide embedded in the cladding layer, wherein the auxiliary waveguide and the receiving waveguide are located in the same waveguide layer of the photonic chip along the thickness direction of the photonic chip, and on a side of the emitting waveguide that is farther away from the receiving waveguide module, and when viewed along the thickness direction of the photonic chip, a distance between the first receiving waveguide and the emitting waveguide is equal to a distance between the auxiliary waveguide and the emitting waveguide.

5. The photonic chip according to claim 4, further comprising:

a second beam splitter embedded in the cladding layer and comprising a fifth port, a sixth port, a seventh port, and an eighth port, wherein the second beam splitter is configured to output a light signal input from the fifth port through the seventh port and the eighth port, to output a light signal input from the seventh port through the fifth port and the sixth port, and to output a light signal input from the eighth port through the fifth port and the sixth port, the fifth port is connected to the third port of the first beam splitter, the seventh port is connected to the emitting waveguide module, and the eighth port is connected to the auxiliary waveguide; and a second optical adjusting monitoring module provided on the cladding layer and connected to the sixth port, wherein the second optical adjusting monitoring module comprises a second photodetector.

6. The photonic chip according to claim 5, wherein
the second beam splitter and the first beam splitter are located in the same waveguide layer of the photonic chip along the thickness direction of the photonic chip, the second photodetector and the first photodetector are located in the same waveguide layer of the photonic chip along the thickness direction of the photonic chip, the second beam splitter and the second photodetector are located in different waveguide layers of the photonic chip along the thickness direction of the photonic chip, and the second optical adjusting monitoring module further comprises a third interlayer converter, and the third interlayer converter is connected to the sixth port and the second photodetector respectively; and the auxiliary waveguide and the second beam splitter are located in different waveguide layers of the photonic chip along the thickness direction of the photonic chip, and the photonic chip further comprises a fourth interlayer converter, and the fourth interlayer converter is connected to the eighth port and the auxiliary waveguide respectively.

7. The photonic chip according to claim 4, further comprising a second coupler, wherein
the second coupler is configured to receive a second optical signal from outside the photonic chip, so that the second optical signal enters the photonic chip, and the auxiliary waveguide is connected to the second coupler.

8. The photonic chip according to claim 1, wherein the first coupler is an edge coupler, and the first coupler comprises:

a first substrate, wherein the first substrate is a part of the substrate;

a first cladding layer provided on the first substrate, wherein the first cladding layer is a part of the cladding layer, and a transmitting waveguide assembly embedded in the first cladding layer and comprising at least two transmitting waveguides, wherein each transmitting waveguide has a first end and a second end that are arranged along a first direction, the first end of the transmitting waveguide is an end of the transmitting waveguide that is closer to a light receiving end of the first coupler, the at least two transmitting waveguides comprise a first transmitting waveguide and at least one second transmitting waveguide, and when viewed along a thickness direction of the first coupler, the first transmitting waveguide and the at least one second transmitting waveguide are arranged along a second direction, the transmitting waveguide assembly is configured to enable a light signal that the at least one second transmitting waveguide transmits to be combined into the first transmitting waveguide in a directional coupling manner, the transmitting waveguide assembly is configured to receive a light signal through the first ends of at least two transmitting waveguides, and to output a light signal through the second end of the first transmitting waveguide;

wherein
the first direction is a direction determined by a direction from the light receiving end of the first coupler to a light emitting end of the first coupler, and the first direction, the second direction, and the thickness direction of the first coupler are all perpendicular to each other; and the photonic chip has a first end portion and a second end portion along the first direction, and a third end portion and a fourth end portion along the second direction that are opposite to each other, the first coupler is located at the first end portion, and a light signal emitted by the emitting waveguide module is emitted through one of the second end portion, the third end portion, and the fourth end portion to outside the photonic chip.

9. The photonic chip according to claim 8, wherein the first transmitting waveguide comprises a first coupling portion, the second transmitting waveguide comprises a second coupling portion, and when viewed along a thickness direction of the first coupler, the first coupling portion and the second coupling portion are arranged along the second direction, and the first coupling portion and the second coupling portion are configured to enable a light signal in the second coupling portion to be combined into the first coupling portion in a directional coupling manner;
wherein
along the first direction, a distance between a center line of the first coupling portion and a center line of the second coupling portion gradually decreases; and/or
along the first direction, a cross-sectional profile of the first coupling portion gradually increases; and/or
along the first direction, a cross-sectional profile of the second coupling portion gradually decreases.

10. The photonic chip according to claim 8, wherein
when viewed along the thickness direction of the first coupler, the first end of the first transmitting waveguide and the first end of the second transmitting waveguide are arranged along the second direction, and the second end of the first transmitting waveguide is farther than the second end of the second transmitting waveguide, and the transmitting waveguide assembly is configured to receive a light signal through the first end of the first transmitting waveguide and the first end of the second transmitting waveguide, and to output a light signal through the second end of the first transmitting waveguide; or
the at least two transmitting waveguides comprise the first transmitting waveguide and at least two second transmitting waveguides, and along the first direction, the first end of the second transmitting waveguide is farther than the first end of the first transmitting waveguide, the first end of the first transmitting waveguide is located between the at least two second transmitting waveguides, and the second end of the first transmitting waveguide is farther than the second end of the second transmitting waveguide, and the transmitting waveguide assembly is configured to receive a light signal through the first end of each of the second transmitting waveguides, and to output a light signal through the second end of the first transmitting waveguide.

11. The photonic chip according to claim 1, wherein the first coupler is an edge coupler, and the first coupler comprises:
a first substrate, wherein the first substrate is a part of the substrate;
a first cladding layer provided on the first substrate, wherein the first cladding layer is a part of the cladding layer; and
a transmitting waveguide assembly embedded in the first cladding layer and comprising at least three transmitting waveguides and a combiner, wherein the at least three transmitting waveguides comprise at least two second transmitting waveguides and a first transmitting waveguide, each transmitting waveguide has a first end and a second end that are arranged along a first direction, the first end of the transmitting waveguides is an end of the transmitting waveguides that is closer to a light receiving end of the first coupler, the at least two second transmitting waveguides are arranged along the second direction with intervals, the combiner has a plurality of input ends and an output end, each input end is connected to the second end of one of the at least two second transmitting waveguides, the output end is connected to the first end of the first transmitting waveguide, and the transmitting waveguide assembly is configured to receive a light signal through the first ends of the at least two second transmitting waveguides, and to output a light signal through the second end of the first transmitting waveguide;
wherein
the first direction is a direction determined by a direction from the light receiving end of the first coupler to a light emitting end of the first coupler, and the first direction, the second direction, and the thickness direction of the first coupler are all perpendicular to each other; and
the photonic chip has a first end portion and a second end portion along the first direction, and a third end portion and a fourth end portion along the second direction that are opposite to each other, the first coupler is located at the first end portion, and a light signal emitted by the emitting waveguide module is emitted through one of the second end portion, the third end portion, and the fourth end portion to outside the photonic chip.

12. The photonic chip according to claim 8, wherein the first cladding layer comprises:
a main portion;
two first connecting portions connected to the main portion and extending along the first direction, and when viewed along a thickness direction of the first coupler, the two first connecting portions are arranged along the second direction; and
a second connecting portion connected to the main portion and extending along the first direction, wherein the second connecting portion is located between the two first connecting portions, and an end of the second connecting portion that is farther away from the main portion is the light receiving end;
wherein the transmitting waveguide assembly is embedded in the second connecting portion and the main portion.

13. A LIDAR, comprising:
a light source module, provided corresponding to the first coupler, and configured to generate the first optical signal; and
the photonic chip according to claim 1, configured to receive the first optical signal through the first coupler.

14. A mobile device, comprising a mobile main body and the LiDAR according to claim 13.

* * * * *